United States Patent
Hirotani et al.

(10) Patent No.: US 11,603,683 B2
(45) Date of Patent: Mar. 14, 2023

(54) LID OPENING AND CLOSING DEVICE FOR VEHICLE

(71) Applicant: KABUSHIKI KAISHA HONDA LOCK, Miyazaki (JP)

(72) Inventors: Kohei Hirotani, Miyazaki (JP); Takashi Yamamoto, Miyazaki (JP); Naruhiko Maeda, Miyazaki (JP)

(73) Assignee: Kabushiki Kaisha Honda Lock, Miyazaki (JP)

( * ) Notice: Subject to any disclaimer, the term of this patent is extended or adjusted under 35 U.S.C. 154(b) by 162 days.

(21) Appl. No.: 16/971,722

(22) PCT Filed: Feb. 25, 2019

(86) PCT No.: PCT/JP2019/007016
§ 371 (c)(1),
(2) Date: Aug. 21, 2020

(87) PCT Pub. No.: WO2019/167869
PCT Pub. Date: Sep. 6, 2019

(65) Prior Publication Data
US 2020/0408011 A1 Dec. 31, 2020

(30) Foreign Application Priority Data

Feb. 27, 2018 (JP) .............................. JP2018-033507
Jun. 29, 2018 (JP) .............................. JP2018-124092

(51) Int. Cl.
*E05B 83/34* (2014.01)
*B60K 15/05* (2006.01)
*E05B 81/04* (2014.01)

(52) U.S. Cl.
CPC .............. *E05B 83/34* (2013.01); *B60K 15/05* (2013.01); *E05B 81/04* (2013.01);
(Continued)

(58) Field of Classification Search
CPC ......... E05B 83/34; E05B 81/04; B60K 15/05; B60K 2015/0538; B60K 2015/0576; E05Y 2201/434; E05Y 2900/534
See application file for complete search history.

(56) References Cited

U.S. PATENT DOCUMENTS 9,038,499 B2 * 5/2015 Ishiguro .................. E05C 19/02
220/315
9,862,265 B2 1/2018 Lee et al.
(Continued)

FOREIGN PATENT DOCUMENTS

JP 2006-348671 A 12/2006
JP 2011-256528 A 12/2011
(Continued)

Primary Examiner — Christine M Mills
Assistant Examiner — James E. Ignaczewski
(74) Attorney, Agent, or Firm — Carrier Shende & Associates, P.C.; Fulchand P. Shende; Joseph P. Carrier

(57) ABSTRACT

A lid opening and closing device for a vehicle includes a restriction member that is operable between a restriction position at which the restriction is applied and a restriction release position at which the restriction is released, an electric motor that drives the restriction member between the restriction position and the restriction release position in response to a door switching between a locked state and an unlocked state, a case that houses the restriction member and the electric motor, and an emergency operation member that can move the restriction member to the restriction release position when the electric motor malfunctions, wherein an operating force-acting direction conversion mechanism is provided between the emergency operation member and the restriction member, the operating force-acting direction conversion mechanism converting the operating force from the emergency operation member into a force that causes operation from the restriction position toward the restriction release position.

14 Claims, 19 Drawing Sheets

(52) U.S. Cl.
CPC ................ *B60K 2015/0538* (2013.01); *B60K 2015/0576* (2013.01); *E05Y 2201/434* (2013.01); *E05Y 2900/534* (2013.01)

(56) References Cited

U.S. PATENT DOCUMENTS

| | | | |
|---|---|---|---|
| 10,683,685 B2* | 6/2020 | Sonobe | E05B 81/28 |
| 2018/0105036 A1* | 4/2018 | Guardianelli | E05B 81/16 |
| 2019/0242161 A1* | 8/2019 | Beck | E05B 83/34 |

FOREIGN PATENT DOCUMENTS

| | | |
|---|---|---|
| JP | 2014-173422 A | 9/2014 |
| JP | 2016-117313 A | 6/2016 |
| JP | 2016-223150 A | 12/2016 |
| WO | 2013/130691 A1 | 9/2013 |
| WO | 2015/083350 A1 | 6/2015 |

\* cited by examiner

LID OPENING AND CLOSING DEVICE FOR VEHICLE

TECHNICAL FIELD

The present invention relates to a lid opening and closing device for a vehicle that includes a rod that can move forward and backward between a pushed-in position, in response to an openable and closable lid being pushed in, and a protruding position when the lid is in an open state. When the rod is in the pushed-in position, the lid attains a lid closed position at which the rod returns from the pushed-in position toward the protruding position side only by a predetermined amount of movement when the lid is in a closed state. The device also includes a restriction member that is capable of operating in a direction orthogonal to the direction of forward and backward movement of the rod, between a restriction position at which movement of the rod at the lid closed position is restricted, and a restriction release position at which the restriction is released. The device also includes an electric motor that drives the restriction member between the restriction position and the restriction release position in response to a door switching between a locked state and an unlocked state. The device further includes a case that houses the restriction member and the electric motor, and an emergency operation member, that can move the restriction member to the restriction release position when the electric motor malfunctions.

BACKGROUND ART

A lid opening and closing device for a vehicle in which a restriction member restricting a rod in a state in which a door is in a closed state is driven by an electric motor, and when the electric motor malfunctions, an emergency operation member is operated in a direction orthogonal to the direction of travel of the rod by pulling a cable is already known from Patent Document 1.

PRIOR ART DOCUMENTS

Patent Documents

Patent Document 1: Japanese Patent Application Laid-open No. 2016-223150

DISCLOSURE OF INVENTION

Problems to be Solved by the Invention

A lid opening and closing device is assembled on a vehicle body so that the direction of forward and backward movement of a rod follows the vehicle width direction, but in the arrangement disclosed in Patent Document 1 if assembly of the lid opening and closing device, which includes the emergency operation member having for example a cable linked thereto, on a vehicle body is attempted from the outside of the vehicle body, since the cable extends in a direction (vehicle fore-and-aft direction or vertical direction) orthogonal to the direction of forward and backward movement of the rod (vehicle width direction), it becomes difficult to insert the lid opening and closing device into an insertion hole formed in the vehicle body in order to assemble the lid opening and closing device, and the ease of assembly becomes poor. If the opening area of the insertion hole is increased, although the ease of assembly is improved, it is not desirable from the viewpoint of vehicle body strength and water resistance.

The present invention has been accomplished in light of such circumstances, and it is an object thereof to provide a lid opening and closing device for a vehicle that can enhance the ease of assembly without widening an insertion hole provided in a vehicle body, by making the direction of operation of an emergency operation member parallel to the direction of forward and backward movement of a rod.

Means for Solving the Problems

In order to attain the above object, according to a first aspect of the present invention, there is provided a lid opening and closing device for a vehicle, comprising a rod that can move forward and backward between a pushed-in position in response to an openable and closable lid being pushed in and a protruding position when the lid is in an open state and that attains a lid closed position at which the rod returns from the pushed-in position toward the protruding position side only by a predetermined amount of movement when the lid is in a closed state, a restriction member that is capable of operating in a direction orthogonal to the direction of forward and backward movement of the rod between a restriction position at which movement of the rod at the lid closed position is restricted and a restriction release position at which the restriction is released, an electric motor that drives the restriction member between the restriction position and the restriction release position in response to a door switching between a locked state and an unlocked state, a case that houses the restriction member and the electric motor, and an emergency operation member that can move the restriction member to the restriction release position when the electric motor malfunctions, characterized in that an operating force-acting direction conversion mechanism is provided between the emergency operation member and the restriction member, the operating force-acting direction conversion mechanism converting the operating force from the emergency operation member moving in a direction parallel to the direction of forward and backward movement of the rod into a force that causes operation from the restriction position toward the restriction release position.

Further, according to a second aspect of the present invention, in addition to the first aspect, the operating force-acting direction conversion mechanism is formed from a projection that is integrally and projectingly provided on the restriction member, and a cam part that is formed on the emergency operation member in an inclined manner so as to obliquely intersect a direction of operation of the restriction member and that abuts against the projection.

According to a third aspect of the present invention, in addition to the first or second aspect, a guide hole is provided in the emergency operation member so as to extend lengthwise in a direction of movement thereof, and a guide projection is projectingly provided on the case, the guide projection guiding movement of the emergency operation member and projecting into the guide hole so as to restrict an end of movement of the emergency operation member.

Moreover, according to a fourth aspect of the present invention, in addition to the first aspect, the operating force-acting direction conversion mechanism is formed from a pressure-receiving projection that is integrally and projectingly provided on the restriction member, a first link member that pivots in response to operation of the emergency operation member, and a second link member that has an extremity part thereof abutting against the pressure-receiving projection from the restriction position side and pivots so as to press the restriction member toward the restriction release position in response to pivoting of the first link member.

Effects of the Invention

In accordance with the first aspect of the present invention, when the emergency operation member is operated in a direction parallel to the direction of forward and backward movement of the rod, the restriction member is operated from the restriction position toward the restriction release position in a direction orthogonal to the direction of forward and backward movement of the rod by the action of the operating force-acting direction conversion mechanism, and due to the direction of operation of the emergency operation member being made parallel to the direction of forward and backward movement of the rod it is possible to enhance the ease of assembly without widening an insertion opening provided in the vehicle body.

Furthermore, in accordance with the second aspect of the present invention, since the operating force-acting direction conversion mechanism is formed from the projection integrally and projectingly provided on the restriction member and the cam part formed on the emergency operation member and abutting against the projection, it is possible to form the operating force-acting direction conversion mechanism as a simple and small structure while avoiding any increase in the number of components by eliminating the necessity for the use of a link mechanism, etc., thus enabling a small size to be achieved for the lid opening and closing device.

In accordance with the third aspect of the present invention, it is possible to guide movement of the emergency operation member and restrict the end of movement of the emergency operation member with a simple arrangement in which the guide projection projectingly provided on the case projects into the guide hole provided in the emergency operation member.

Moreover, in accordance with the fourth aspect of the present invention, since the operating force-acting direction conversion mechanism is formed from the pressure-receiving projection integrally and projectingly provided on the restriction member and from the link mechanism formed from the first and second link members, it is possible to simply form the operating force-acting direction conversion mechanism from the link mechanism having a minimum number of components.

EXPLANATION OF REFERENCE NUMERALS AND SYMBOLS

Figure 1:
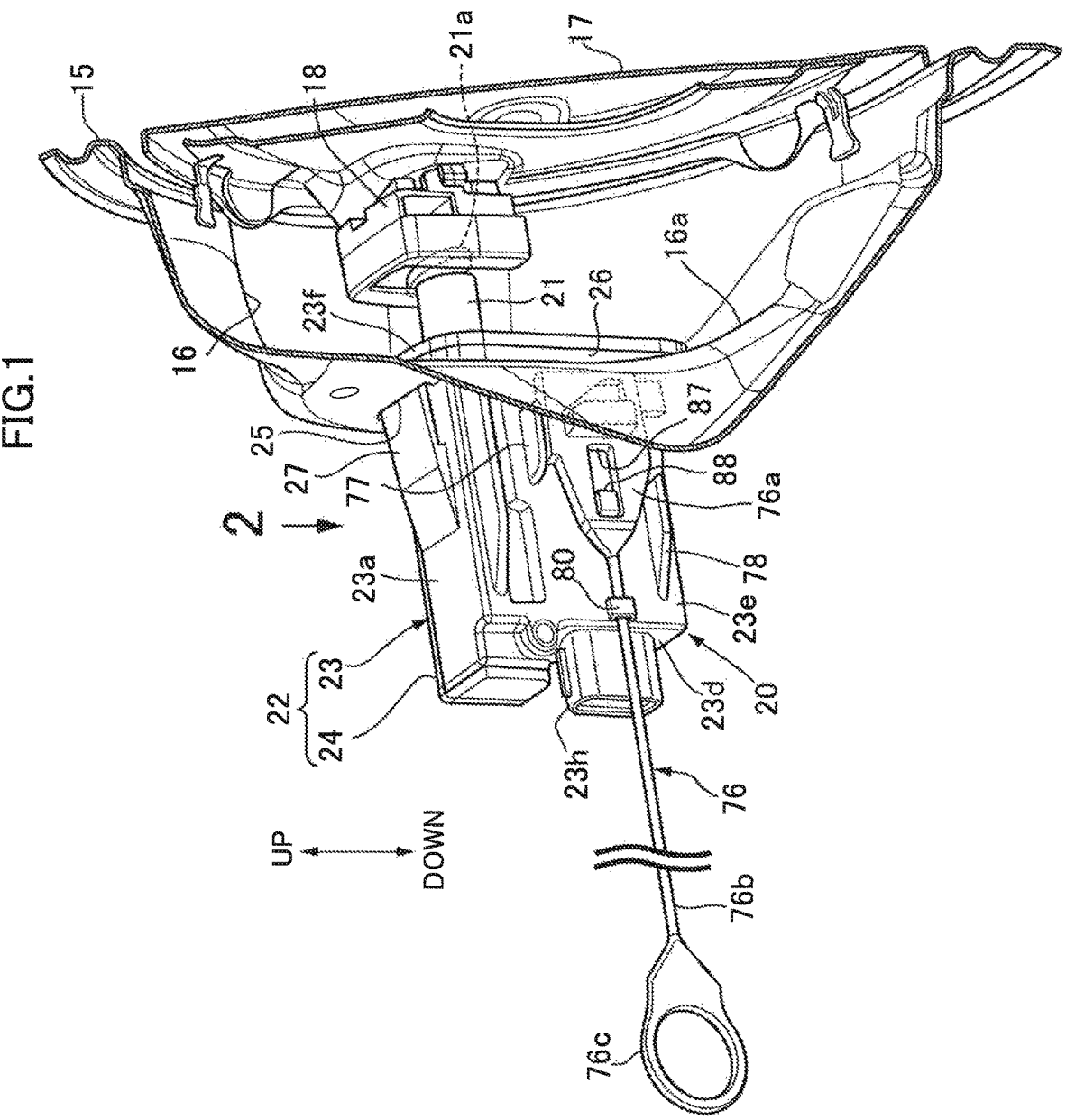
FIG. 1 is a perspective view illustrating a first embodiment in which a vehicle body exterior plate is cut away and showing a state in which a lid opening and closing device is mounted. (first embodiment)
Figure 2:
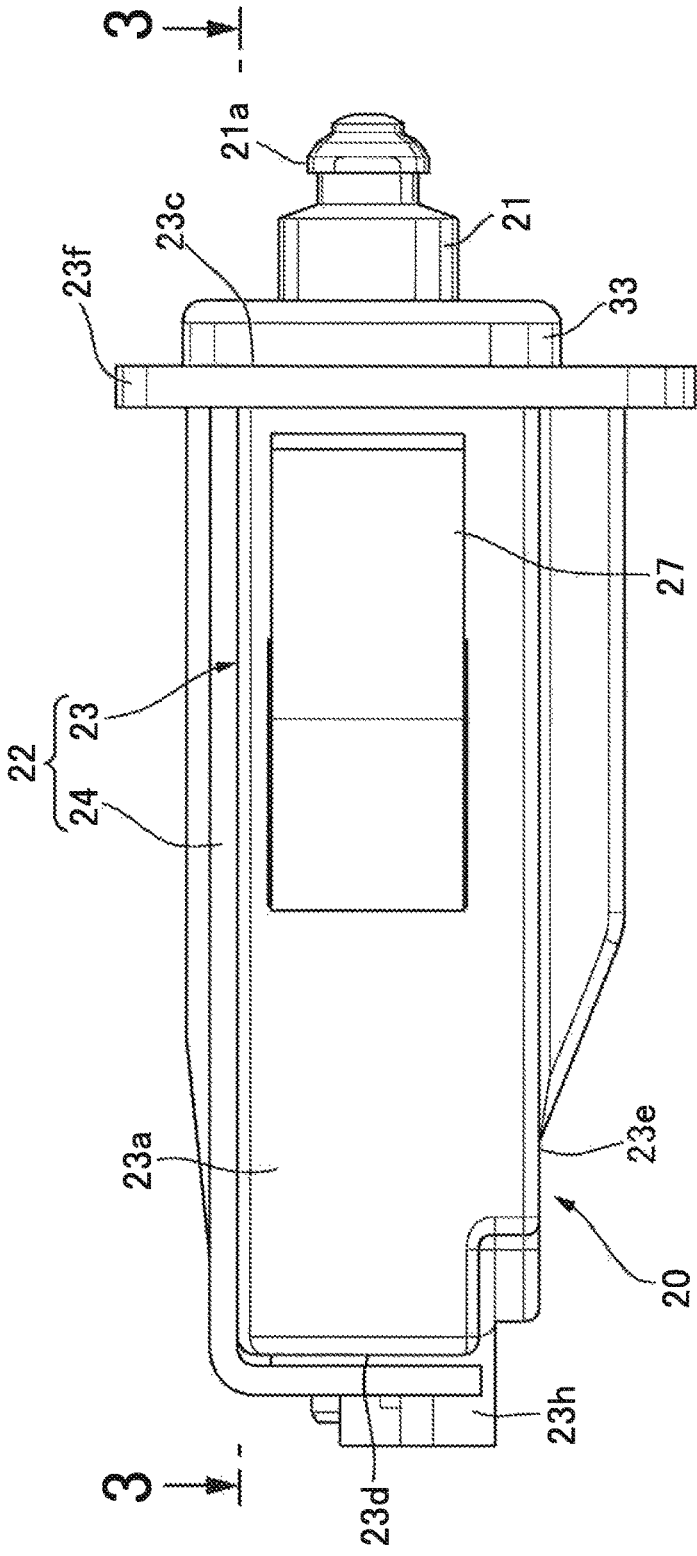
FIG. 2 is a plan view of the lid opening and the closing device from the direction of arrow 2 in FIG. 1 when a rod is at a lid closed position. (first embodiment)

17 Lid
21 Rod
22, 92 Case
28, 94 Restriction member
29 Electric motor
76 Emergency operation member
82 Projection
84, 103 Operating force-acting direction conversion mechanism
85 Cam part
87 Guide slot
88 Guide projection
104 Pressure-receiving projection
105 First link member
106 Second link member

MODE FOR CARRYING OUT THE INVENTION

Embodiments of the present invention are explained by reference to the attached drawings.

First Embodiment

A first embodiment of the present invention is explained by reference to FIG. 1 to FIG. 13; first, in FIG. 1, a recess part 16 is formed in a vehicle body exterior plate 15 of a vehicle, a fuel supply part, which is not illustrated, facing the recess part 16, and a base end part of a lid 17 is pivotably supported on the vehicle body exterior plate 15, the lid 17 openably and closably closing the recess part 16. A latching part 18 is provided on an inner face on a free end side of the lid 17, and a case 22 of a lid opening and closing device 20 is mounted on a bottom wall 16a of the recess part 16, the lid opening and closing device 20 having a rod 21 having provided on its extremity part an engagement portion 21a that detachably engages with the latching part 18.

Referring in addition to FIG. 2 to FIG. 6, the case 22 is formed from a case main body 23 formed into a rectangular box shape and a cover 24 joined to the case main body 23 so as to close an open end of the case main body 23.

The case main body 23 integrally has an upper side wall 23a and lower side wall 23b extending in the vehicle width direction with a gap therebetween in the vertical direction, an outer side wall 23c extending in the vertical direction while joining end parts on the outer side in the vehicle width direction of the upper and lower side walls 23a and 23b, an inner side wall 23d extending in the vertical direction while joining end parts on the inner side in the vehicle width direction of the upper and lower side walls 23a and 23b, and a flat plate-shaped end wall 23e connectedly provided in common on end parts on one side in the vehicle fore-and-aft direction of the upper side wall 23a, the lower side wall 23b, the outer side wall 23c and the inner side wall 23d. The cover 24 is joined to the case main body 23 from the other side in the vehicle fore-and-aft direction so as to oppose the end wall 23e.

A rectangular insertion hole 25 (see FIG. 1) is formed in the bottom wall 16a of the recess part 16, and the case 22 is inserted into the insertion hole 25 from the outer side in the vehicle width direction. Moreover, a rectangular collar portion 23f is integrally and connectedly provided with the outer side wall 23c of the case main body 23 so as to protrude outward from the outer periphery thereof, and the case 22 is inserted into the insertion hole 25 from the outer side in the vehicle width direction so that a rectangular inner seal member 26 surrounding an end part, on the collar portion 23f side, of the case 22 is disposed between the collar portion 23f and an outer face of the bottom wall 16a at the peripheral edge of the insertion hole 25. A base end part of an elastic claw 27 is connectedly provided on the upper side wall 23a and the lower side wall 23b of the case main body 23, the elastic claw 27 passing through the insertion hole 25 due to it flexing when the case 22 is inserted into the insertion hole 25, and an extremity part of the elastic claw 27 abutting against an inner face of the bottom wall 16a. That is, the inner seal member 26 and the bottom wall 16a are held between the collar portion 23f and the elastic claw 27, thereby mounting the case 22 on the bottom wall 16a.

The lid opening and closing device 20 includes the rod 21, a restriction member 28 that can restrict movement of the rod 21, and an electric motor 29 that drives the restriction member 28. The restriction member 28 and the electric motor 29 are housed within the case 22.

The rod 21 is disposed so as to extend in the vehicle width direction in an upper part of the case 22 and is movably supported on the case main body 23 of the case 22. A support rib 31 extends in the longitudinal direction of the rod 21 and is integrally and projectingly provided on an inner face of the end wall 23e of the case main body 23, the support rib 31 having on the protruding end a sliding contact support face 30 that is recessed into an arc shape so as to be in sliding contact with part of an outer peripheral face of the rod 21, which has a circular cross section. A through hole 32 is formed in an upper part of the outer side wall 23c of the case main body 23, the rod 21 being axially movably inserted through the through hole 32, a short cylindrical portion 23g protruding from the outer side wall 23c toward the recess part 16 side so as to form part of the through hole 32 is integrally and projectingly provided on the upper part of outer side wall 23c, and an annular outer seal member 33 is fitted onto the short cylindrical portion 23g, the outer seal member 33 being in resilient sliding contact with the outer periphery of the rod 21.

A holder 35 is fitted onto the rod 21 within the case 22. The holder 35 is formed so as to have a substantially U-shaped cross-sectional shape that opens on the end wall 23e side, and an engagement collar 35a is formed integrally with the holder 35, the engagement collar 35a being engaged with an annular groove 36 formed in the outer periphery of the rod 21. The holder 35 is thereby fitted onto the rod 21 so that it can pivot relative thereto within a limited range around the axis of the rod 21 while being unable to move relative to the rod 21 in the axial direction.

A ring-shaped spring housing recess part 37 is formed in the rod 21 at a location close to the inner side wall 23d of the case main body 23 so as to be coaxial with the axis of the rod 21 and open on the outer side wall 23c side, and a coil spring 38 partially housed within the spring housing recess part 37 is provided between the rod 21 and the outer side wall 23c.

Figure 7:
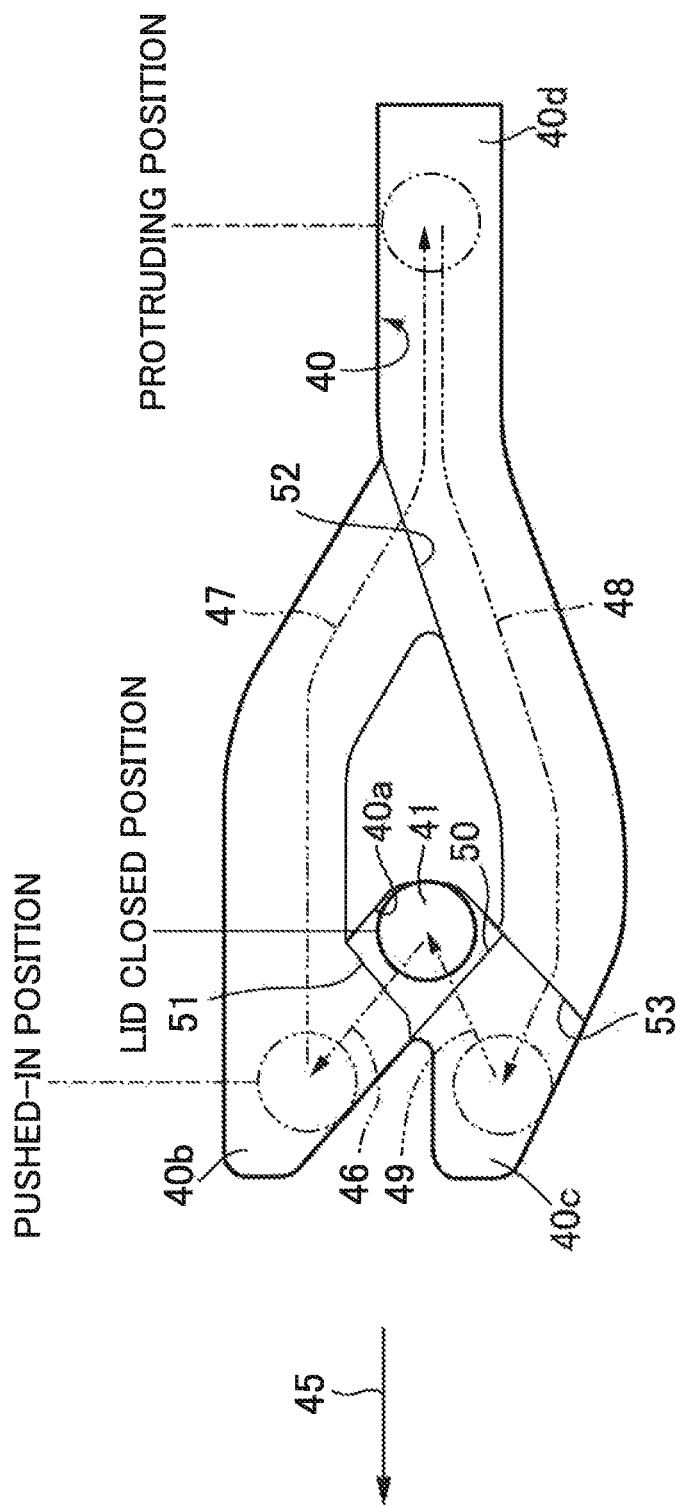
FIG. 7 is a diagram for explaining change of position of a pin within an axial position-restricting groove. (first embodiment)

The rod 21 is urged, by the resilient force of the coil spring 38, in a direction in which the engagement portion 21a on its extremity part protrudes from the vehicle body exterior plate 15, and in order to restrict the axial position of the rod 21 an axial position-restricting groove 40 shown in FIG. 7 is formed in an outer face of the holder 35 on the side opposite to the upper side wall 23a of the case main body 23, a pin 41 being inserted into the axial position-restricting groove 40.

An arm plate 42 formed from a plate spring is disposed between the holder 35 and the electric motor 29 so as to extend lengthwise in the longitudinal direction of the rod 21, a shaft 43 inserted into a base end part of the arm plate 42 is held between the case main body 23 and the cover 24, and the arm plate 42 is supported on the shaft 43 so that it can pivot within a permitted range within the case 22.

The pin 41 is fixed close to the free end part of the arm plate 42, and a projecting part 44 is projectingly provided on the case main body 23, the projecting part 44 abutting against a location close to the base end part of the arm plate 42 from the side opposite to the rod 21. The arm plate 42 thereby exhibits a resilient force that urges the pin 41 toward the holder 35 side.

Figure 8:
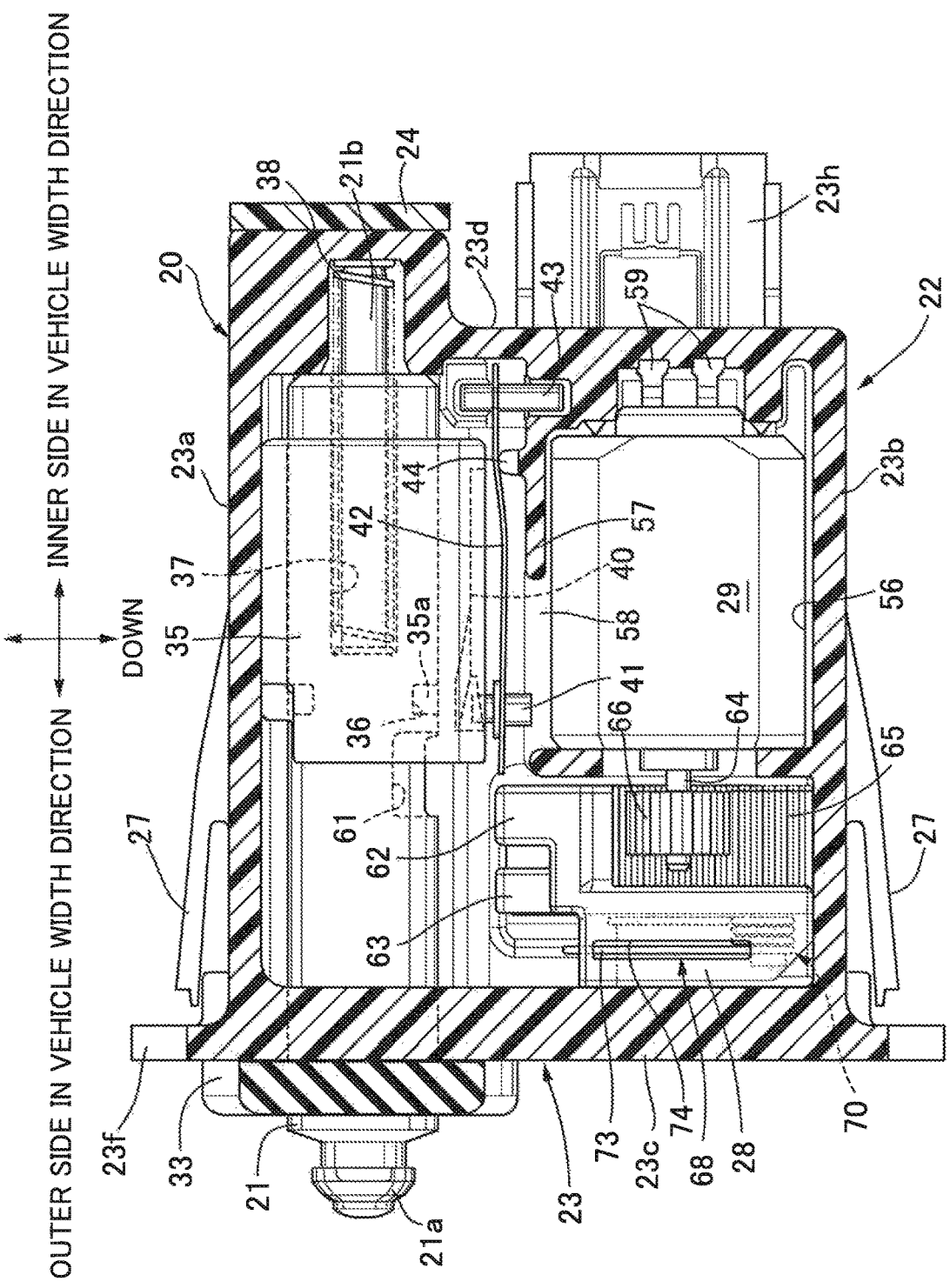
FIG. 8 is a sectional view, corresponding to FIG. 3, of the lid opening and the closing device in a state in which the rod is at a pushed-in position. (first embodiment)
Figure 9:
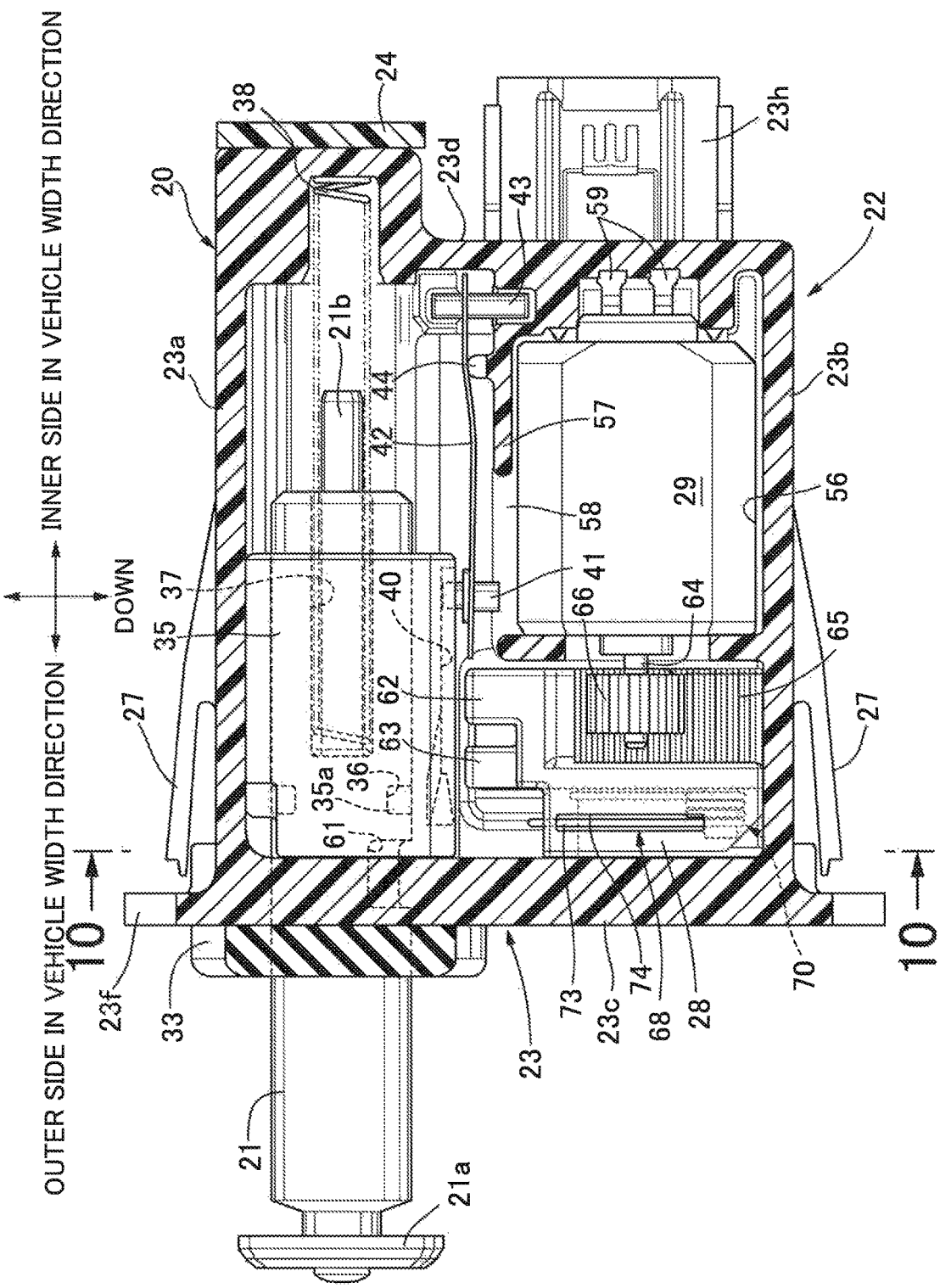
FIG. 9 is a sectional view, corresponding to FIG. 3, of the lid opening and the closing device in a state in which the rod is at a protruding position. (first embodiment)

The rod 21 is capable of moving forward and backward between a pushed-in position in which it is pushed in against the resilient force of the coil spring 38 as shown in FIG. 8 in response to the lid 17 in a closed state and an open state being pushed in, and a protruding position in which it is made to protrude greatly from the case 22 by means of the resilient force of the coil spring 38 as shown in FIG. 9 when the lid 17 is in the open state and, moreover, when the lid 17 is in the closed state the rod 21 attains, as shown in FIG. 2, FIG. 3, FIG. 4 and FIG. 6, a lid closed position in which it returns from the pushed-in position toward the protruding position side only by a predetermined amount of movement.

A round bar-shaped stopper 21b is coaxially, integrally and projectingly provided on the rod 21 in an end part on the inner side wall 23d of the case main body 23, and when as shown in FIG. 8 the rod 21 is in the pushed-in position the stopper 21b, abuts against the inner side wall 23d of the case main body 23 and restricts the movement end of the rod 21 in the pushing-in direction. The holder 35 functions to restrict the protruding position of the rod 21, and the holder 35 is mounted on the rod 21 so that in a state in which the rod 21 is in the protruding position, as shown in FIG. 9 the holder 35 abuts against the outer side wall 23c of the case main body 23 and restricts the movement end of the rod 21 in the protrusion direction.

Referring to FIG. 7, the axial position-restricting groove 40 is formed so as to have a pin-receiving portion 40a that is made to abut against the pin 41 in a direction along an urging direction shown by arrow 45 while preventing the rod 21 from moving to the protruding position by receiving, with the pin 41, the holder 35 urged in the urging direction together with the rod 21 by means of the coil spring 38 when the rod 21 is in the lid closed position, first and second pushed-in position-receiving portions 40b and 40c that receive the pin 41 when the rod 21 and the holder 35 are in the pushed-in position, and a protruding position-receiving portion 40d that receives the pin 41 when the rod 21 and the holder 35 are in the protruding position.

When the lid 17 in the closed position is pushed in, the pin 41 is displaced as shown by an arrow 46 from the pin-receiving portion 40a to the first pushed-in position-receiving portion 40b by means of movement of the rod 21 and the holder 35 to the pushed-in position, and when the rod 21 and the holder 35 are moved to the protruding position due to release of a force pushing in the lid 17 the pin 41 is displaced as shown by an arrow 47 from the first pushed-in position-receiving portion 40b to the protruding position-receiving portion 40d. When the rod 21 is pushed in together with the lid 17 in a state in which the lid 17 is in the open position, the pin 41 is displaced as shown by an arrow 48 to the second pushed-in position-receiving portion 40c due to movement of the rod 21 and the holder 35 to the pushed-in position, and when the rod 21 and the holder 35 are moved to the lid closed position due to release of a force pushing in the lid 17, the pin 41 is displaced as shown by an arrow 49 from the second pushed-in position-receiving portion 40c to the pin-receiving portion 40a, and abuts against the pin-receiving portion 40a.

Formed in the axial position-restricting groove 40 are a first step part 50 that prevents reverse displacement of the pin 41 from the pin-receiving portion 40a to the second pushed-in position-receiving portion 40c, a second step part 51 that prevents reverse displacement of the pin 41 from the first pushed-in position-receiving portion 40b to the pin-receiving portion 40a, a third step part 52 that prevents reverse displacement of the pin 41 from the protruding position-receiving portion 40d to the first pushed-in position-receiving portion 40b, and a fourth step part 53 that prevents reverse displacement of the pin 41 from the second pushed-in position-receiving portion 40c to the protruding position-receiving portion 40d.

The engagement portion 21a in the extremity part of the rod 21 has a substantially T-shaped form; in a state in which the lid 17 is in the closed position the engagement portion 21a is engaged with the latching part 18 and when the lid 17 is opened the engagement with the latching part 18 is released, and due to the rod 21 spinning on its axis by 90 degrees the engagement portion 21a is switched between engagement with the latching part 18 and release of the engagement.

Figure 6:
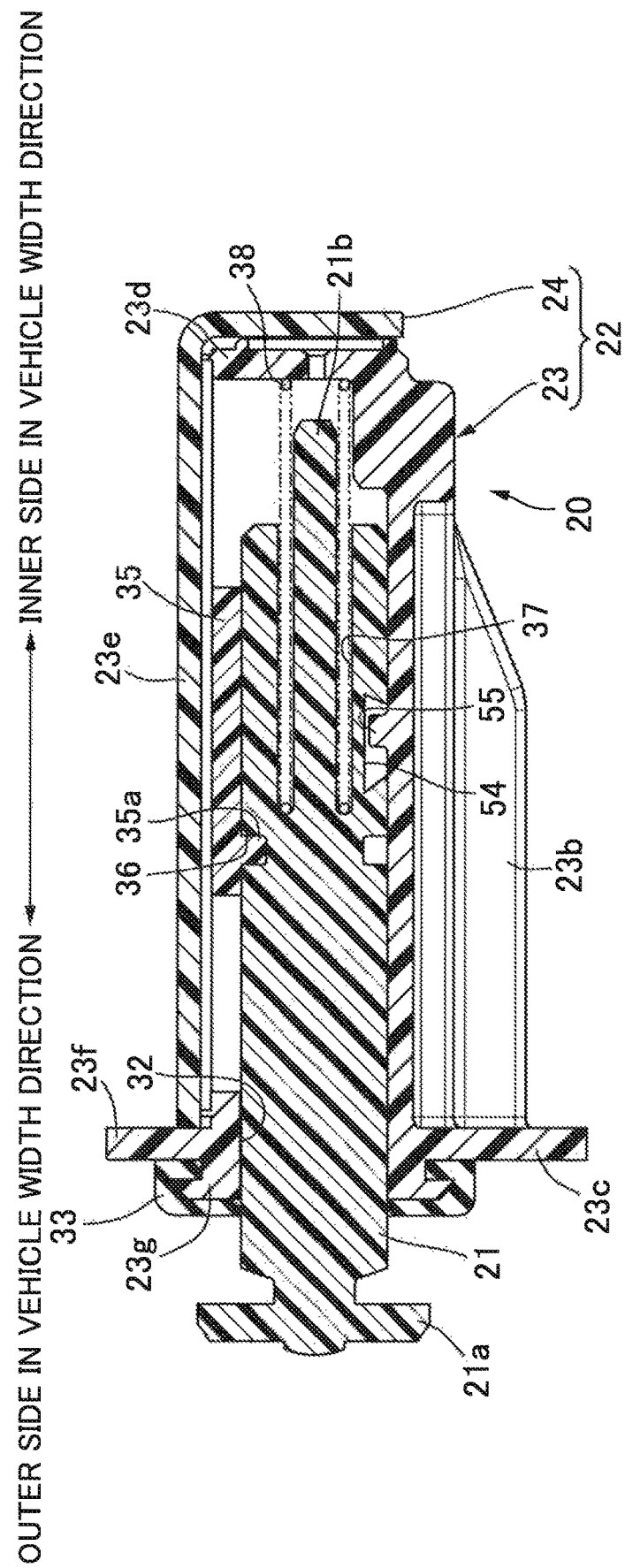
FIG. 6 is a sectional view along line 6-6 in FIG. 3. (first embodiment)

Referring to FIG. 6, a helical guide groove 54 is formed in an outer periphery of the rod 21 that faces the end wall 23e side of the case main body 23, and a projection 55 projecting into the guide groove 54 is integrally and projectingly provided on the end wall 23e. The guide groove 54 is formed so as to make the rod 21 spin on its axis by 90 degrees while the rod 21 moves in the axial direction between the pushed-in position and the protruding position.

The electric motor 29 has a rotational axis parallel to the axis of the rod 21, and is housed within the case 22 so as to be disposed toward the inner side of the case main body 23 beneath the rod 21 and the holder 35. Integrally and projectingly provided on the case main body 23 is a substantially L-shaped dividing wall 57 that forms, in cooperation with the inner side wall 23d and the lower side wall 23b, a motor housing recess part 56 housing the electric motor 29. Moreover, formed in the dividing wall 57 is a cutout part 58 that houses part of the pin 41 fixed to the arm plate 42. Formed integrally with the inner side wall 23d is a connector portion 23h, a pair of connection terminals 59 connected to the electric motor 29 facing the interior of the connector portion 23h.

Figure 3:
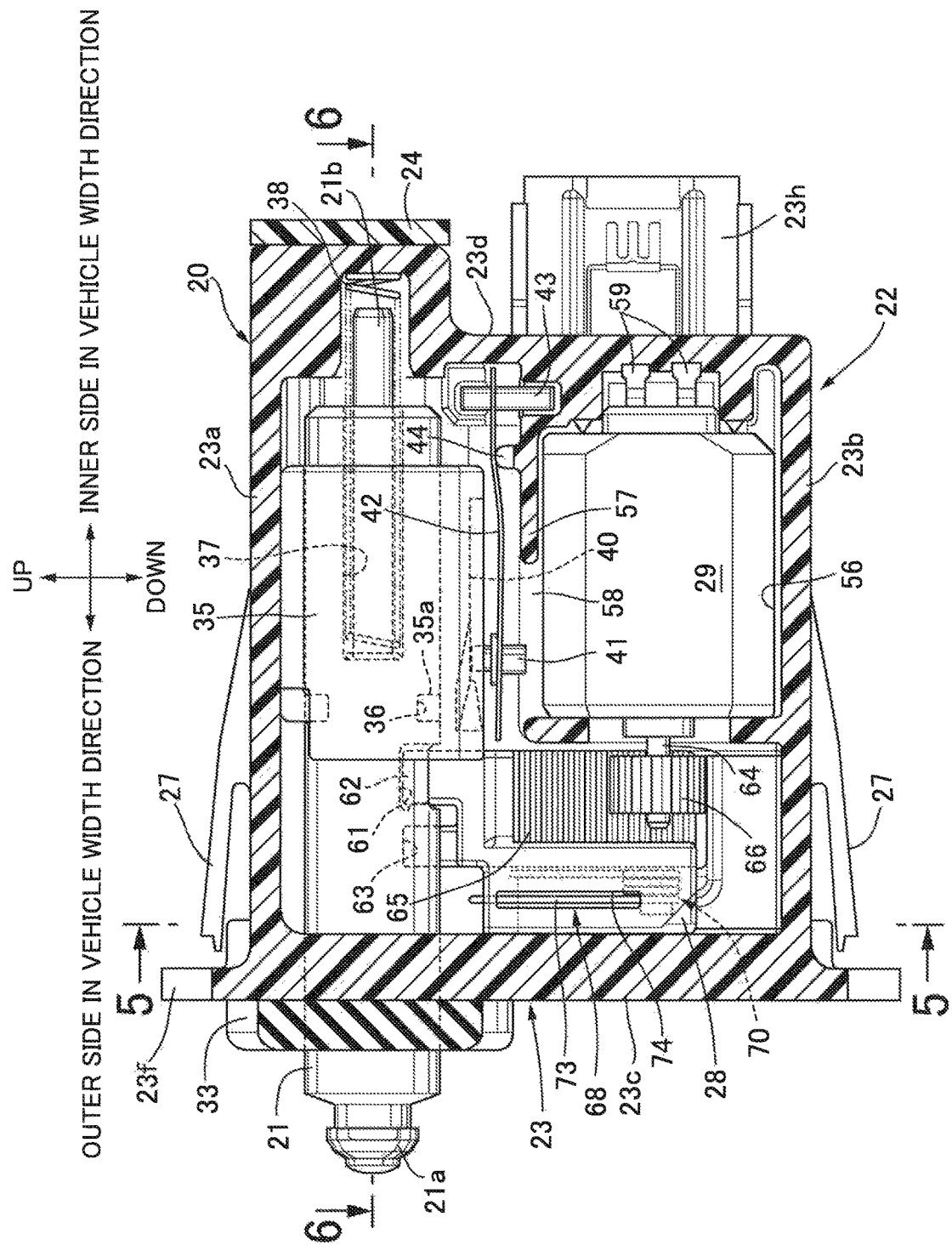
FIG. 3 is a sectional view along line 3-3 in FIG. 2 when a door is in a locked state. (first embodiment)
Figure 4:
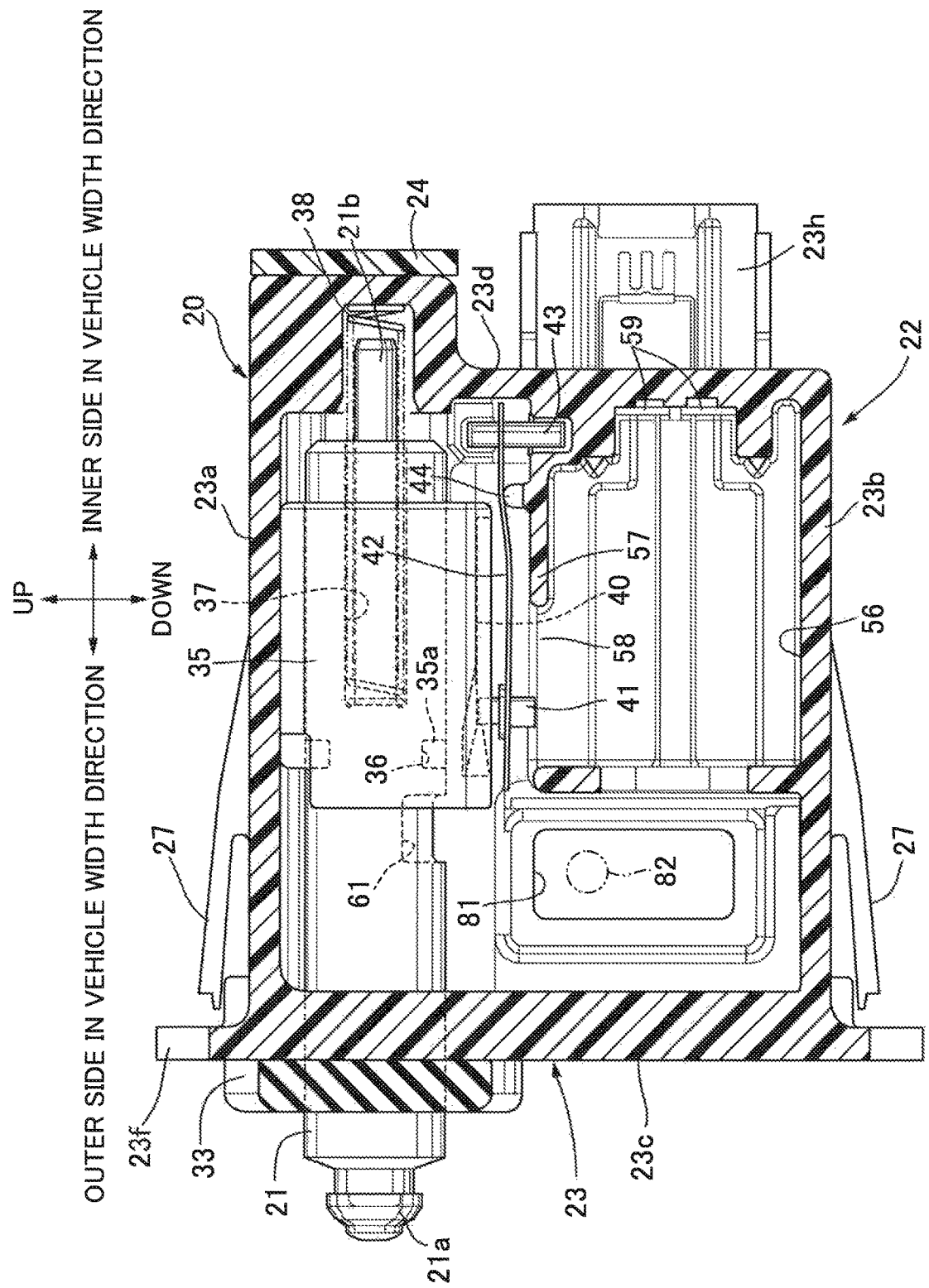
FIG. 4 is a sectional view, corresponding to FIG. 3, in a state in which an electric motor and a restriction member are removed. (first embodiment)
Figure 5:
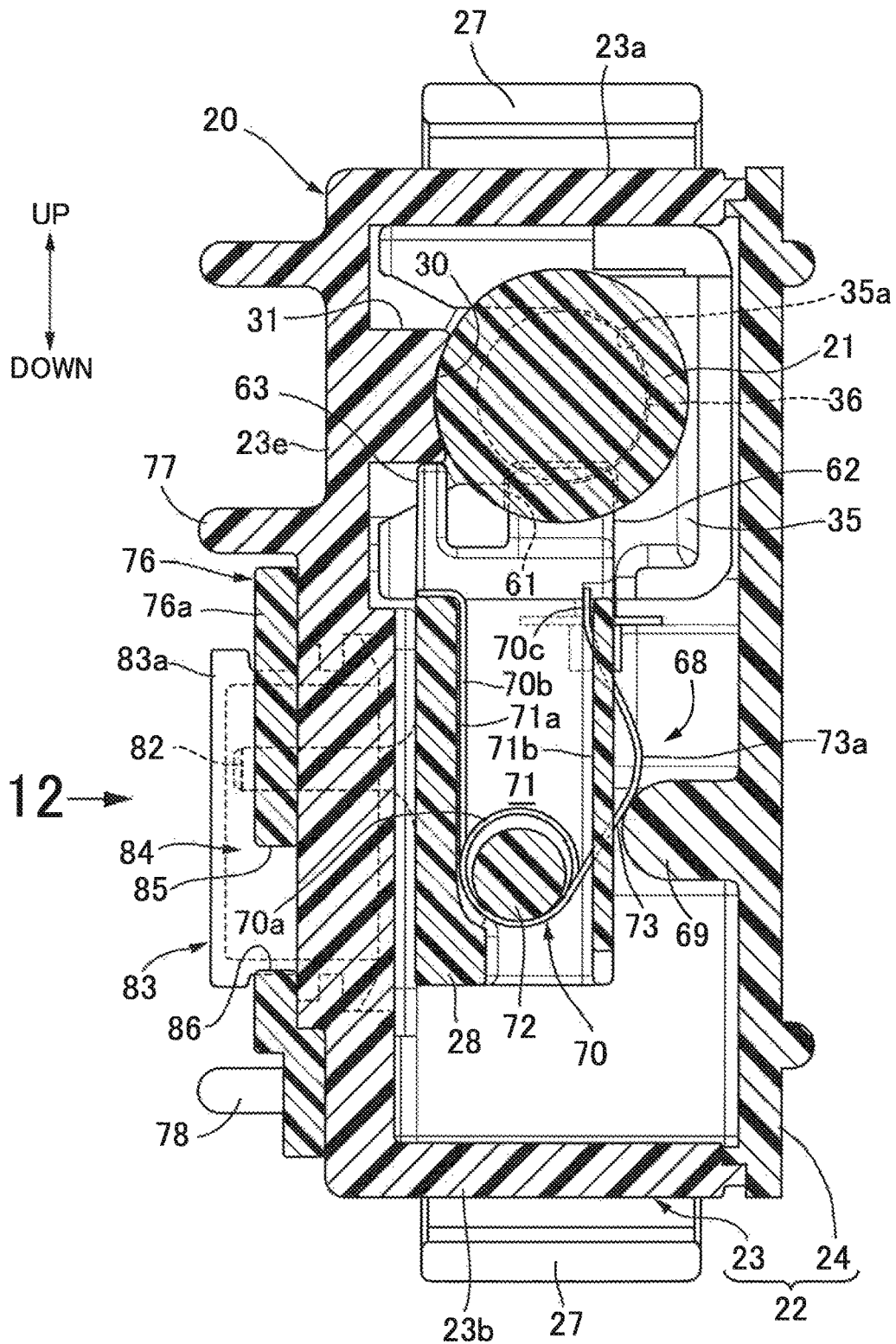
FIG. 5 is a sectional view along line 5-5 in FIG. 3. (first embodiment)
Figure 10:
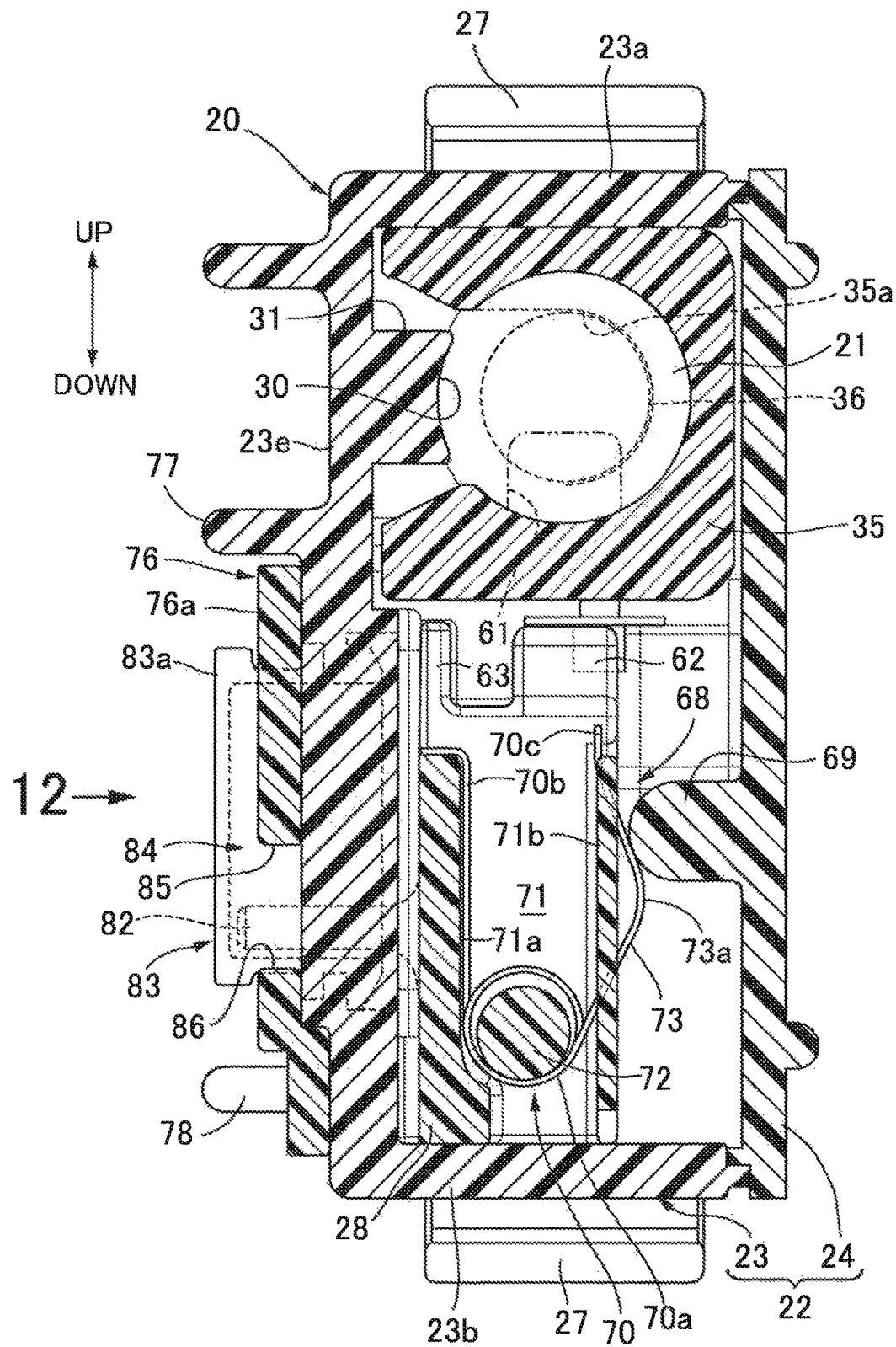
FIG. 10 is a sectional view along line 10-10 in FIG. 9. (first embodiment)

The restriction member 28 is housed within the case 22 so as to be disposed beneath the rod 21 and holder 35 further outside in the vehicle width direction than the electric motor 29, and is housed in the case 22 so as to operate in a direction orthogonal to the direction of forward and backward movement of the rod 21, that is, in the vertical direction in the first embodiment, between a restriction position as shown in FIG. 3 and FIG. 5 in which it engages with the rod 21 in the lid closed position and restricts movement of the rod 21 and a restriction release position as shown in FIG. 8, FIG. 9 and FIG. 10 in which it releases engagement with the rod 21, moves to the side away from the rod 21, and releases restriction of the rod 21.

A latching recess part 61 facing the restriction member 28 side when rod 21 is in the lid closed position is formed in the outer periphery of the rod 21, and an engagement projection 62 that is fitted into and engaged with the latching recess part 61 when the rod 21 is in the lid closed position is projectingly provided on an end part, on the rod 21 side, of the restriction member 28. A stopper 63 is integrally and projectingly provided on the end part, on the rod 21 side, of the restriction member 28, the stopper 63 determining the restriction position of the restriction member 28 by abutting against the support rib 31 projectingly provided on the inner face of the end wall 23e as shown in FIG. 5 when the restriction member 28 moves to the restriction position in a state in which the rod 21 is in the lid closed position.

An output shaft 64 of the electric motor 29 has an axis parallel to the axis of the rod 21, that is, orthogonal to the direction of operation of the restriction member 28, and rotatably extends through the dividing wall 57 and protrudes on the restriction member 28 side. On the other hand, a rack 65 is provided on the restriction member 28 so as to extend along the direction of movement thereof, and a pinion 66 provided on the output shaft 64 meshes with the rack 65. The restriction member 28 is therefore driven so as to operate between the restriction position and the restriction release position by means of operation of the electric motor 29.

The electric motor 29 operates only for a predetermined time (e.g. 0.6 sec) in response to the vehicle door being switched between the locked state and the unlocked state by means of a keyless button operation of a vehicle user or a smart entry system; the electric motor 29 drives the restriction member 28 to the restriction position when the door is in the locked state, and the electric motor 29 drives the restriction member 28 to the restriction release position when the door is in the unlocked state.

Figure 11:
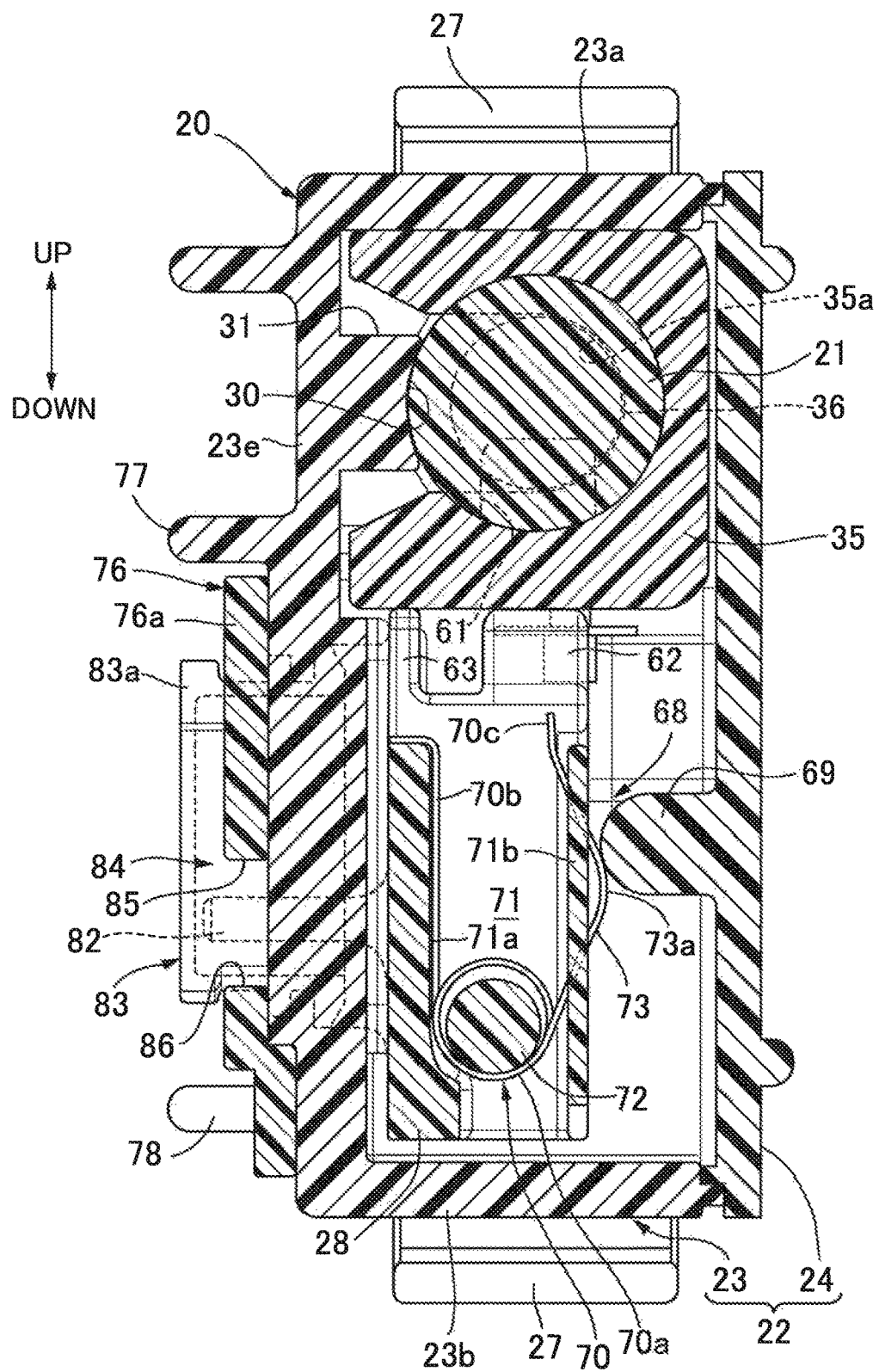
FIG. 11 is a sectional view, corresponding to FIG. 10, when the door attains a locked state in a state in which the rod is at the protruding position. (first embodiment)

In a state in which the rod 21 is in the protruding position, that is, a state in which the lid 17 is open, if a vehicle user erroneously puts the door into a locked state, although the restriction member 28 in the restriction release position is driven to the restriction position side by means of the electric motor 29, the restriction member 28 is unable to engage with the rod 21 in the protruding position; as shown in FIG. 11, the engagement projection 62 and the stopper 63 of the restriction member 28 abut against the holder 35 before attaining the restriction position, and movement of the restriction member 28 to the restriction position is thus prevented. Because of this, when operation of the electric motor 29 is stopped, there is a possibility that the restriction member 28 will stop at a halfway position before attaining the restriction position, but the restriction member 28 is returned to the restriction release position by the action of a holding mechanism 68.

The holding mechanism 68 resiliently holds at least the restriction release position of the restriction member 28 and is formed from an abutment part 69 provided integrally with the cover 24 forming part of the case 22, and an elastic member 70 that is mounted on the restriction member 28 while abutting against the abutment part 69 so as to urge the restriction member 28 toward the restriction release position side when the restriction member 28 is at a position where it is partway through moving from the restriction release position toward the restriction position side.

A groove 71 is formed in the restriction member 28 over the entire length along the direction of movement of the restriction member 28, the groove 71 opening on the outer side wall 23c side of the case main body 23, and a support shaft 72 disposed within the groove 71 is integrally and projectingly provided on the restriction member 28. The elastic member 70 has a coil portion 70a surrounding the support shaft 72 and first and second arm portions 70b and 70c extending from opposite ends of the coil portion 70a.

The first arm portion 70b of the elastic member 70 abuts against and is supported on the side wall 71a, which is, among side walls 71a and 71b on opposite sides of the groove 71, further from the cover 24. An extremity part of the second arm portion 70c abuts against and is supported, among the side walls 71a and 71b on opposite sides of the groove 71, on the side wall 71b on the cover 24 side, and an angled elastic part 73 curving so as to bulge on the cover 24 side is formed on an intermediate part of the second arm portion 70c. A slit 74 having the elastic part 73 inserted therethrough is provided in the restriction member 28, the elastic part 73 protruding from the slit 74 toward the cover 24 side.

On the other hand, the abutment part 69 projectingly provided on the cover 24 always abuts against the elastic part 73; in a state in which the restriction member 28 is in the restriction release position, as shown in FIG. 10 the elastic part 73 abuts against the abutment part 69 via a portion further toward the extremity part side of the second arm portion 70c than an angled apex portion 73a, and the elastic part 73 exhibits a resilient force urging the restriction member 28 toward the restriction release position side. In a state in which the restriction member 28 is in the restriction position, as shown in FIG. 5 the elastic part 73 abuts against the abutment part 69 via a portion further toward the side opposite to the extremity part of the second arm portion 70c than the angled apex portion 73a, and the elastic part 73 exhibits a resilient force urging the restriction member 28 toward the restriction position side. When the restriction member 28 is as shown in FIG. 11 in an intermediate position between the restriction position and the restriction release position, without the abutment part 69 overriding the apex portion 73a of the elastic part 73 the elastic part 73 abuts against the abutment part 69 via a portion further on the extremity part side of the second arm portion 70c than the apex portion 73a, and the elastic part 73 exhibits a resilient force urging the restriction member 28 toward the restriction release position side. When the restriction member 28 is driven toward the restriction position side by means of the electric motor 29 and the restriction member 28 attains a halfway position before attaining the restriction position, the restriction member 28 is thereby returned to the restriction release position by the action of the holding mechanism 68 accompanying operation of the electric motor 29 being stopped.

When the electric motor 29 malfunctions, since the lid 17 cannot be opened unless the restriction member 28 restricting the rod 21 in a lid closed state is returned to the restriction release position by a manual operation, the lid opening and closing device 20 is provided with an emergency operation member 76 that is capable of moving the restriction member 28 to the restriction release position when the electric motor 29 malfunctions.

Figure 12:
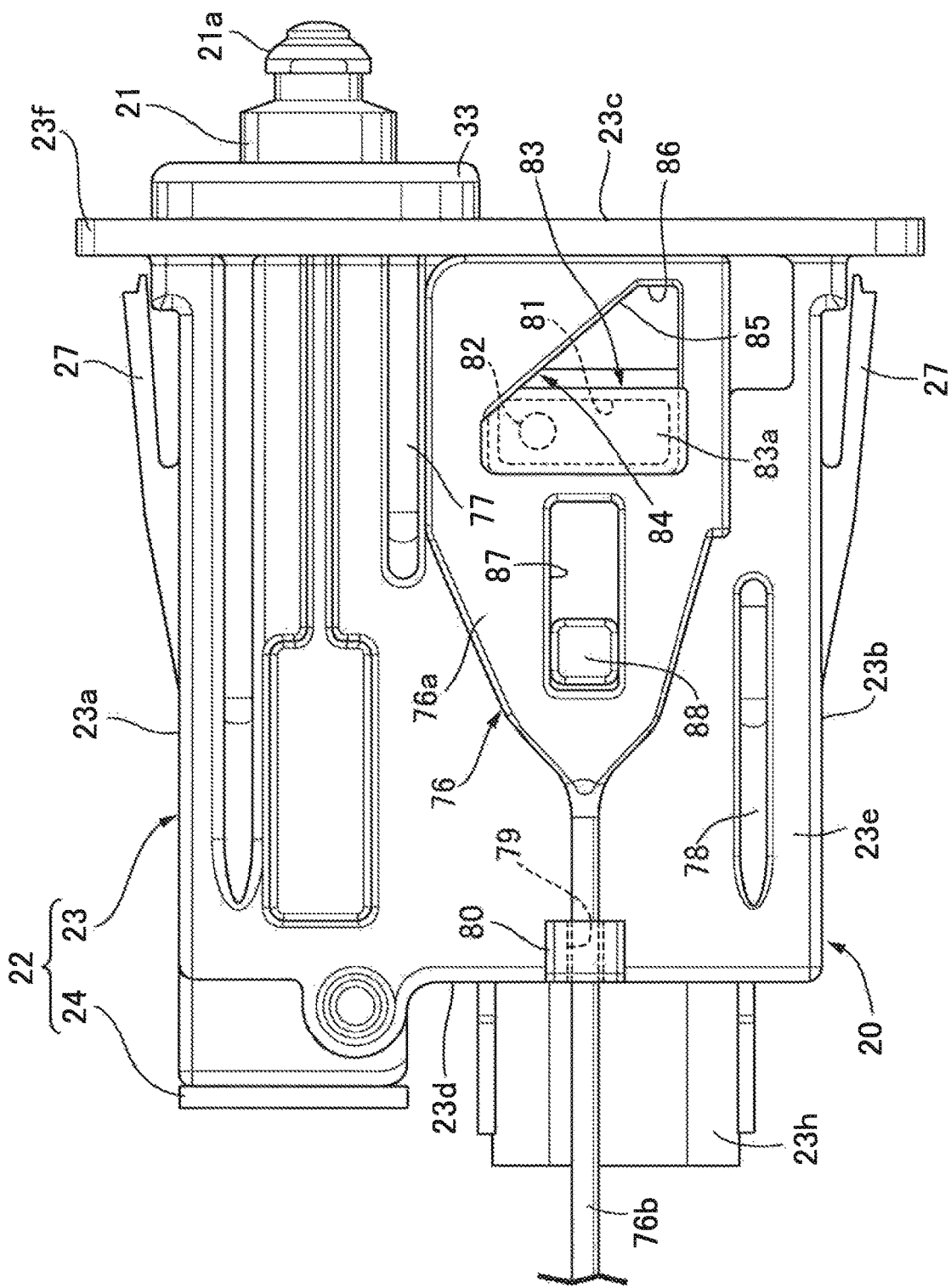
FIG. 12 is a view in the direction of arrow 12 in FIG. 5. (first embodiment)

In FIG. 12, the emergency operation member 76 is capable of moving in a direction parallel to the direction of movement of the rod 21 along an outer face of the end wall 23e of the case main body 23 of the case 22, and integrally has a flat plate-shaped operating member main portion 76a that is in sliding contact with the outer face of the end wall 23e, a rod-shaped portion 76b that is connected integrally to the operation main part and extends inward in the vehicle width direction in parallel with the direction of movement of the rod 21, and an operating portion 76c that has a circular hole and is provided on an extremity part of the rod-shaped portion 76b.

Integrally and projectingly provided on an outer face of the end wall 23e are an upper guide rib 77 that can come into sliding contact with an upper edge part of the operating member main portion 76a, and a lower guide rib 78 that can come to sliding contact with a lower edge part of the operating member main portion 76a, the upper guide rib 77 and the lower guide rib 78 extending in parallel with the direction of forward and backward movement of the rod 21 at positions spaced in the vertical direction. Integrally and projectingly provided on the outer face of the end wall 23e is a guide projecting part 80 having a guide hole 79 into which the rod-shaped portion 76b is movably fitted.

Integrally and projectingly provided on the restriction member 28 is a rod-shaped projection 82 that extends through a rectangular opening 81 (see FIG. 4) provided in the end wall 23e and protrudes upward, the opening 81 being formed lengthwise along the direction of movement of the restriction member 28 so as to allow movement of the projection 82 when the restriction member 28 moves between the restriction release position and the restriction position. Furthermore, a seal rubber 83 having a rectangular pouch portion 83a covering the projection 82 from the outside is fitted into the opening 81.

An operating force-acting direction conversion mechanism 84 is provided between the restriction member 28 and the emergency operation member 76. When the emergency operation member 76 is operated in a direction parallel to the direction of forward and backward movement of the rod 21 so as to move the emergency operation member 76, the operating force-acting direction conversion mechanism 84 converts the operating force from the emergency operation member 76 into a force operating the restriction member 28 from the restriction position toward the restriction release position in a direction orthogonal to the direction of forward and backward movement of the rod 21.

This operating force-acting direction conversion mechanism 84 is formed from the projection 82 integrally and projectingly provided on the restriction member 28 and a cam part 85 that is formed on the emergency operation member 76 in an inclined manner so as to obliquely intersect the direction of operation of the restriction member 28 and abuts against the projection 82. One side edge of a window 86 formed in the operating member main portion 76a so as to have the pouch portion 83a of the seal rubber 83 inserted therethrough is inclined as the cam part 85 so as to obliquely intersect the direction of operation of the restriction member 28.

The operating member main portion 76a of the emergency operation member 76 has provided therein a guide slot 87 extending lengthwise in the direction of movement thereof. Projectingly provided on the outer face of the end wall 23e of the case main body 23 of the case 22 is a guide projection 88 that projects into the guide slot 87 so as to guide movement of the emergency operation member 76 and restrict the end of movement of the emergency operation member 76.

Figure 13:
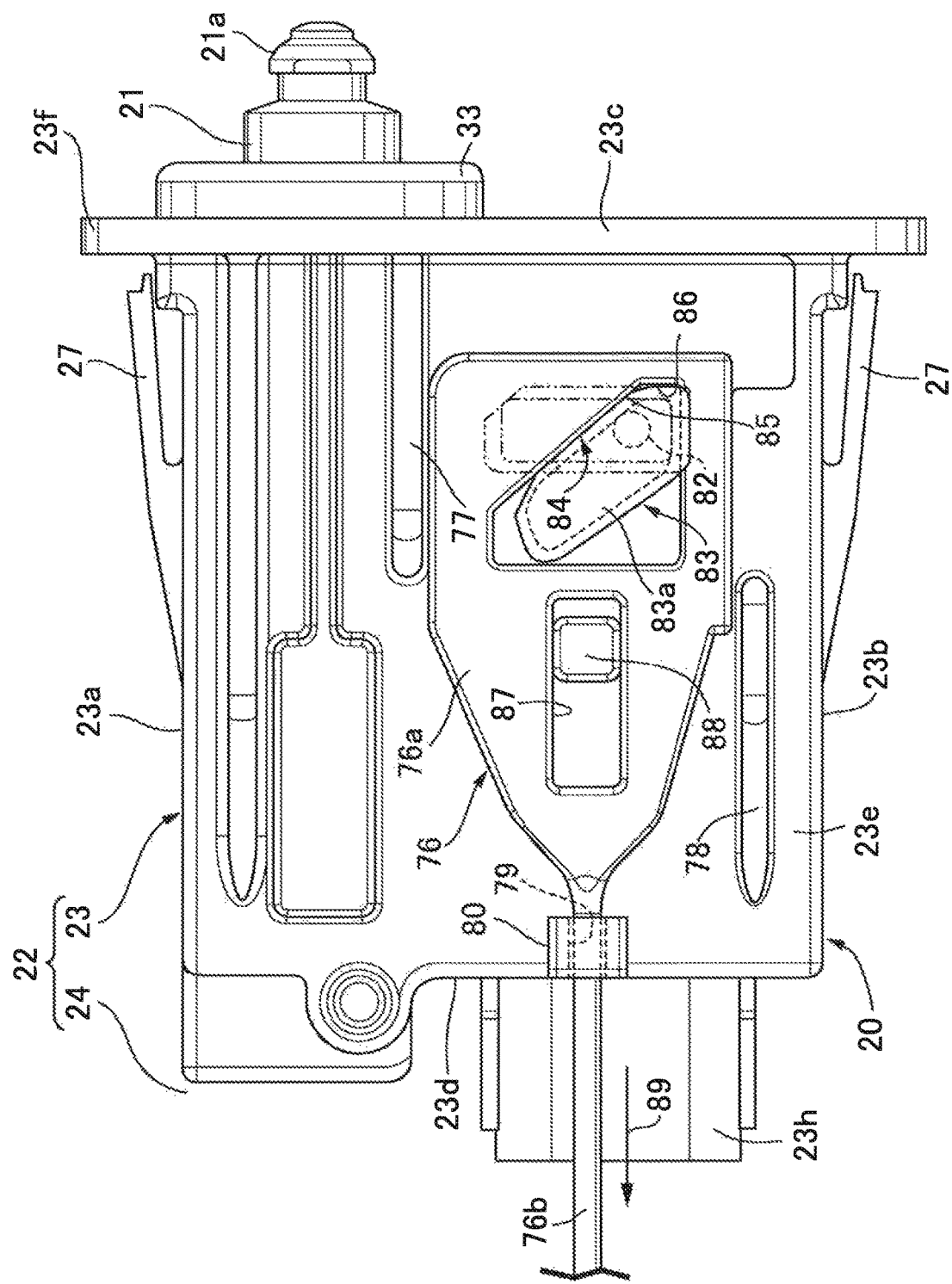
FIG. 13 is a diagram, corresponding to FIG. 12, in a state in which an emergency operation member is operated. (first embodiment)

When the emergency operation member 76 is operated in the direction shown by an arrow 89 in FIG. 13 in a state in which the restriction member 28 is in the restriction position, the operating force from the emergency operation member 76 in a direction parallel to the direction of forward and backward movement of the rod 21 is converted, and a force that operates the restriction member 28 from the restriction position to the restriction release position in a direction orthogonal to the direction of forward and backward movement of the rod 21 acts on the projection 82 of the restriction member 28 via the pouch portion 83a of the seal rubber 83. In this arrangement, the pouch portion 83a of the seal rubber 83 deforms and flexes as shown in FIG. 13, and the reaction force of the pouch portion 83a makes the emergency operation member 76 return to the original position.

The operation of the first embodiment is now explained; since the lid opening and closing device 20 includes the holding mechanism 68 resiliently holding at least the restriction release position of the restriction member 28, even if the door is erroneously locked in a state in which the rod 21 is in the protruding position, due to the restriction release position of the restriction member 28 being resiliently held by the holding mechanism 68, the restriction member 28 will not stop at a halfway position before attaining the restriction position, and the restriction member 28 is held in the restriction release position. It is therefore unnecessary to carry out an operation of returning the door from the locked state to the unlocked state, and carrying out the locking operation after moving the rod 21 to the lid closed position enables movement of the rod 21 to be smoothly restricted, thus enhancing the convenience.

Furthermore, since the holding mechanism 68 is formed from the abutment part 69 provided integrally with the cover 24 forming part of the case 22, and the elastic member 70 mounted on the restriction member 28 while abutting against the abutment part 69 so as to urge the restriction member 28 toward the restriction release position side when the restriction member 28 is at position where it is partway through moving from the restriction release position toward the restriction position side, it is possible to form the holding mechanism 68 while avoiding any increase in the number of components.

Moreover, since the operating force-acting direction conversion mechanism 84, which converts the operating force from the emergency operation member 76 in the direction parallel to the direction of forward and backward movement of the rod 21 into the force for operating the restriction member 28 from the restriction position toward the restriction release position is provided between the restriction member 28 and the emergency operation member 76 of the lid opening and closing device 20, when the emergency operation member 76 is operated in the direction parallel to the direction of forward and backward movement of the rod 21, the restriction member 28 is operated from the restriction position toward the restriction release position in the direction orthogonal to the direction of forward and backward movement of the rod 21 by the action of the operating force-acting direction conversion mechanism 84, and due to the direction of operation of the emergency operation member 76 being made parallel to the direction of forward and backward movement of the rod 21 it is possible to enhance the ease of assembly without widening the insertion hole 25 provided in the vehicle body exterior plate 15.

Furthermore, since the operating force-acting direction conversion mechanism 84 is formed from the projection 82, which is integrally and projectingly provided on the restriction member 28, and the cam part 85, which is formed on the emergency operation member 76 in an inclined manner so as to obliquely intersect the operating direction of the restriction member 28 and abuts against the projection 82, it is possible to form the operating force-acting direction conversion mechanism 84 as a simple and small structure while avoiding any increase in the number of components by eliminating the necessity for the use of a link mechanism, etc., thus enabling a small size to be achieved for the lid opening and closing device 20.

Moreover, since the emergency operation member 76 is provided with the guide slot 87 extending lengthwise in the direction of movement thereof, and the guide projection 88 is projectingly provided on the case 22, the guide projection 88 projecting into the guide slot 87 so as to guide movement of the emergency operation member 76 and restrict the end of movement of the emergency operation member 76, it is possible to guide movement of the emergency operation member 76 and restrict the end of movement of the emergency operation member 76 with a simple arrangement in which the guide projection 88 projectingly provided on the case 22 projects into the guide hole 87 provided in the emergency operation member 76.

Second Embodiment

A second embodiment of the present invention is explained by reference to FIG. 14 to FIG. 20; parts corresponding to those of the first embodiment shown in FIG. 1 to FIG. 13 are denoted by the same reference numerals and symbols and only illustrated, detailed explanation thereof being omitted.

Figure 14:
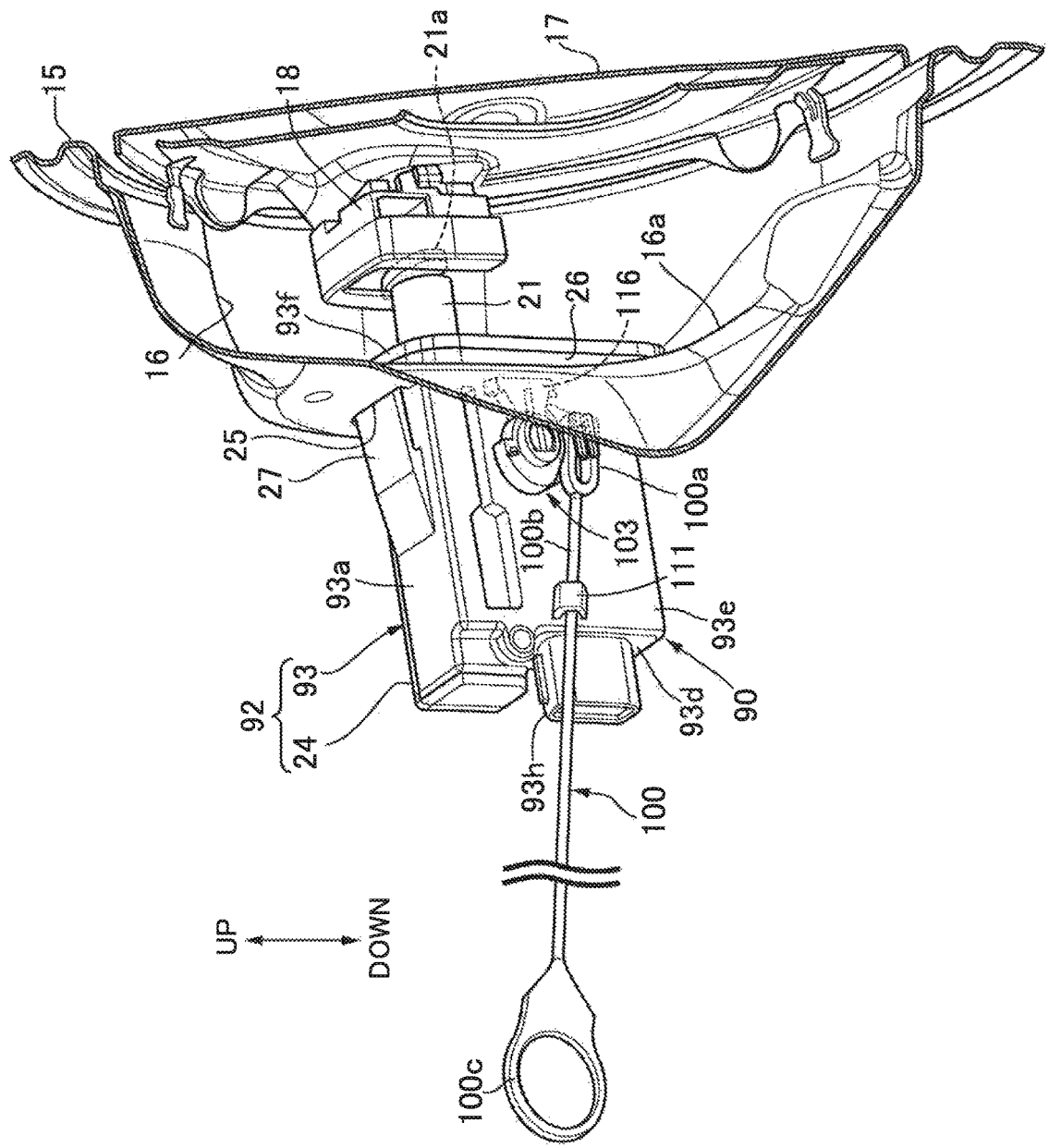
FIG. 14 is a perspective view, corresponding to FIG. 1, of a second embodiment. (second embodiment)

First, in FIG. 14, a base end part of a lid 17 that can open and close a recess part 16 formed in a vehicle body exterior plate 15 of a vehicle is pivotably supported on the vehicle body exterior plate 15, and a case 92 of a lid opening and closing device 90 having a rod 21 having provided on its extremity part an engagement portion 21a that detachably engages with a latching part 18 provided on the lid 17 is mounted on a bottom wall 16a of the recess part 16.

Figure 15:
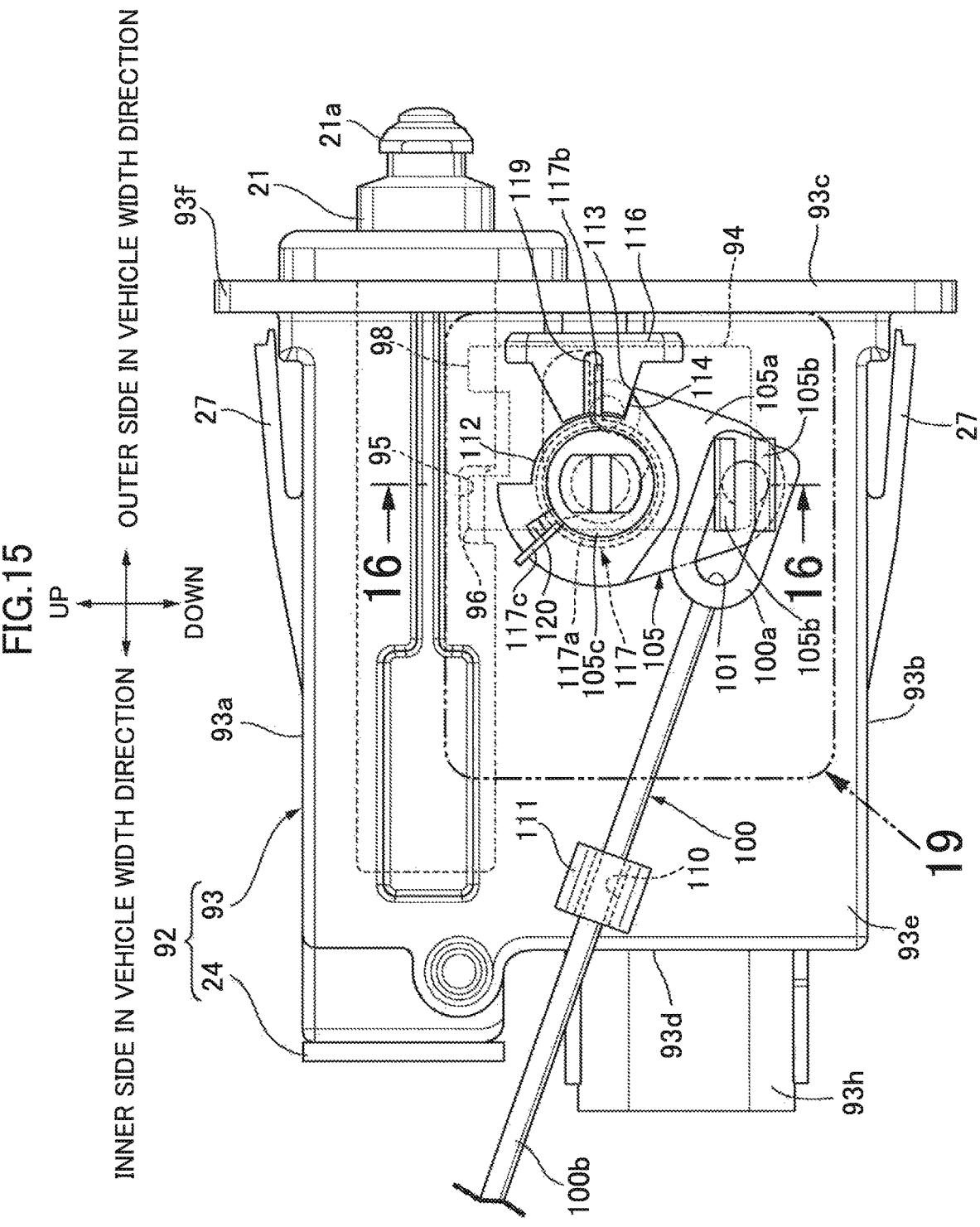
FIG. 15 is a view, corresponding to FIG. 12, when an emergency operation member is in a non-operated state. (second embodiment)

Referring in addition to FIG. 15, the case 92 is formed from a case main body 93 formed into a rectangular box shape and a cover 24 joined to the case main body 93 so as to close an open end of the case main body 93.

The case main body 93 integrally has an upper side wall 93a and lower side wall 93b extending in the vehicle width direction with a gap therebetween in the vertical direction, an outer side wall 93c extending in the vertical direction while joining end parts on the outer side in the vehicle width direction of the upper and lower side walls 93a and 93b, an inner side wall 93d extending in the vertical direction while joining end parts on the inner side in the vehicle width direction of the upper and lower side walls 93a and 93b, and a flat plate-shaped end wall 93e connectedly provided in common on end parts on one side in the vehicle fore-and-aft direction of the upper side wall 93a, the lower side wall 93b, the outer side wall 93c and the inner side wall 93d. The cover 24 is joined to the case main body 93 from the other side in the vehicle fore-and-aft direction so as to oppose the end wall 93e.

Base end parts of elastic claws 27 are connectedly provided on the upper side wall 93a and the lower side wall 93b, the elastic claw 27 passing through a rectangular insertion hole 25 formed in the bottom wall 16a of the recess part 16 due to it flexing when the case 92 is inserted into the insertion hole 25 from the outside in the vehicle width direction, and extremity parts of the elastic claws 27 abut against an inner face of the bottom wall 16a. A rectangular inner seal member 26 is disposed between an outer face of the bottom wall 16a at the peripheral edge of the insertion hole 25 and a collar portion 93f of the case 92.

Figure 16:
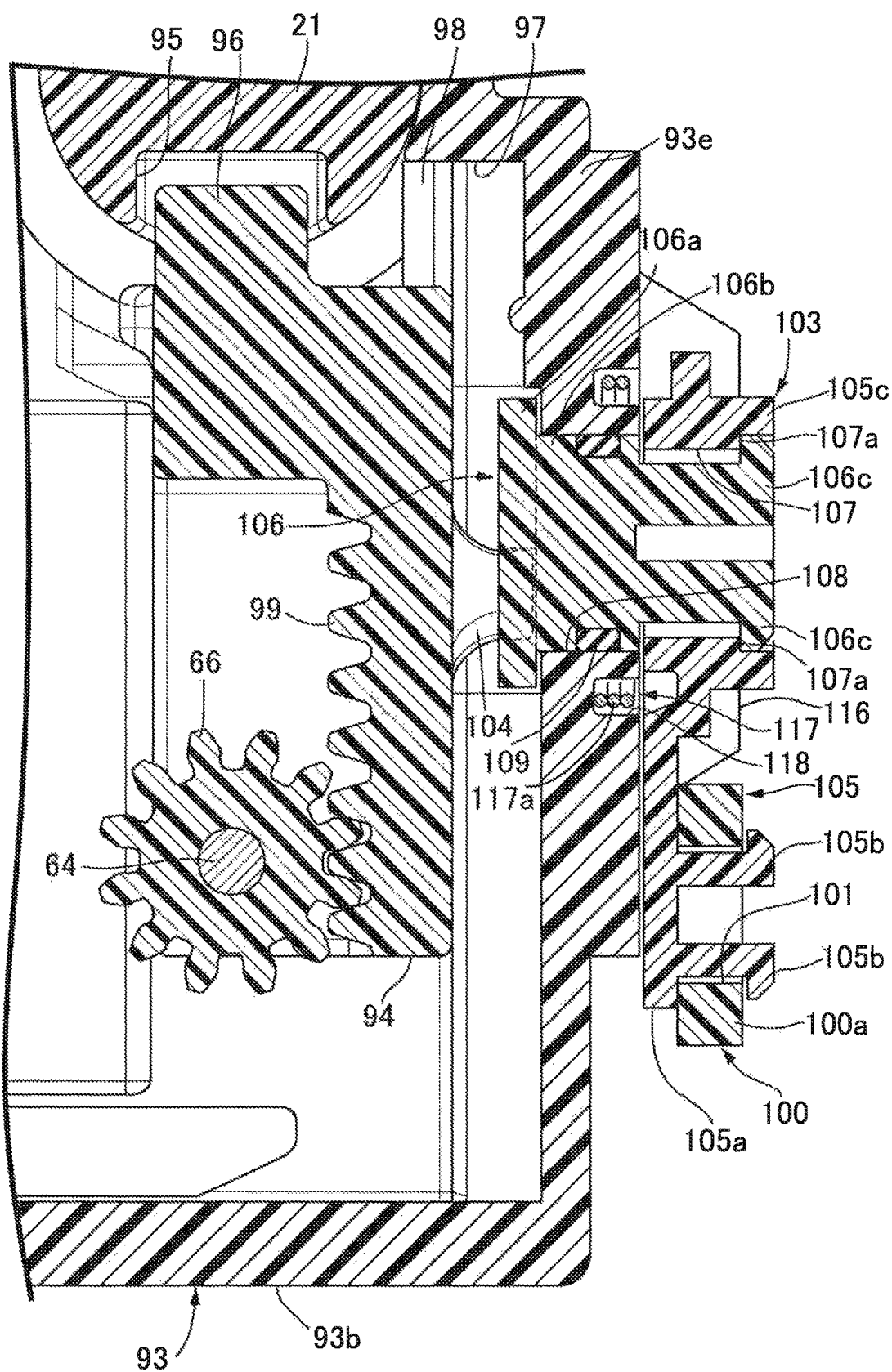
FIG. 16 is a sectional view along line 16-16 in FIG. 15. (second embodiment)

Referring in addition to FIG. 16, the lid opening and closing device 90 includes the rod 21, a restriction member 94 that is capable of restricting movement of the rod 21, and an electric motor 29 (see first embodiment) that drives the restriction member 94, the restriction member 94 and the electric motor 29 being housed within the case 92.

Formed integrally with the inner side wall 93d of the case main body 93 is a connector portion 93h, a pair of connection terminals 59 (see first embodiment) connected to the electric motor 29 facing the interior of the connector portion 93h.

The restriction member 94 is housed in the case 92 so as to be operated in a direction orthogonal to the direction of forward and backward movement of the rod 21 between a restriction position at which it engages with the rod 21 in the lid closed position and restricts movement of the rod 21 and a restriction release position at which it releases engagement with the rod 21, moves to the side away from the rod 21, and releases restriction of the rod 21.

A latching recess part 95 facing the restriction member 94 side when the rod 21 is in the lid closed position is formed in the outer periphery of the rod 21, and an engagement projection 96 that is fitted into and engaged with the latching recess part 95 when the rod 21 is in the lid closed position is projectingly provided on an end part, on the rod 21 side, of the restriction member 94. A stopper 98 is integrally and projectingly provided on the end part, on the rod 21 side, of the restriction member 94, the stopper 98 determining the restriction position of the restriction member 94 by abutting against a restriction step part 97 formed on an inner face of the end wall 93e when the restriction member 94 moves to the restriction position in a state in which the rod 21 is in the lid closed position.

An output shaft 64 of the electric motor 29 has an axis parallel to the axis of the rod 21, that is, orthogonal to the direction of operation of the restriction member 94. A rack 99 is provided on the restriction member 94 so as to extend along the direction of movement thereof, and a pinion 66 provided on the output shaft 64 meshes with the rack 99. The restriction member 94 is therefore driven so as to operate between the restriction position and the restriction release position by means of operation of the electric motor 29.

When the electric motor 29 malfunctions, since the lid 17 cannot be opened unless the restriction member 94 is returned to the restriction release position by a manual operation, the lid opening and closing device 90 is provided with an emergency operation member 100 that is capable of moving the restriction member 94 to the restriction release position when the electric motor 29 malfunctions.

The emergency operation member 100 can move along an outer face of the end wall 93e in the case main body 93 of the case 92, and integrally has a linking portion 100a having an elongated hole-shaped first linking hole 101, a rod-shaped portion 100b integrally connected to the linking portion 100a, and an operating portion 100c having a circular hole and being provided on an extremity part of the rod-shaped portion 100b. The rod-shaped portion 100b is inclined so as to be positioned upward in going from the linking portion 100a toward the inner side in the vehicle width direction. A guide projecting part 111 having a guide hole 110 into which the rod-shaped portion 100b is movably fitted is integrally and projectingly provided on the outer face of the end wall 93e, and the emergency operation member 100 can move along the longitudinal direction of the rod-shaped portion 100b.

An operating force-acting direction conversion mechanism 103 is provided between the restriction member 94 and the emergency operation member 100. When the emergency operation member 100 is operated in a direction parallel to the direction of forward and backward movement of the rod 21 so as to move the emergency operation member 100, the operating force-acting direction conversion mechanism 103 converts the operating force from the emergency operation member 100 into a force operating the restriction member 94 from the restriction position toward the restriction release position in a direction orthogonal to the direction of forward and backward movement of the rod 21.

The operating force-acting direction conversion mechanism 103 is formed from a pressure-receiving projection 104 integrally and projectingly provided on the restriction member 94, a first link member 105 pivoting in response to operation of the emergency operation member 100, and a second link member 106 that has its extremity part abutting against the pressure-receiving projection 104 from the restriction position side and that pivots so as to press the restriction member 94 toward the restriction release position in response to pivoting of the first link member 105. The pressure-receiving projection 104 is integrally and projectingly provided on the restriction member 94 so that its extremity part closely opposes an inner face of the end wall 93e.

Figure 17:
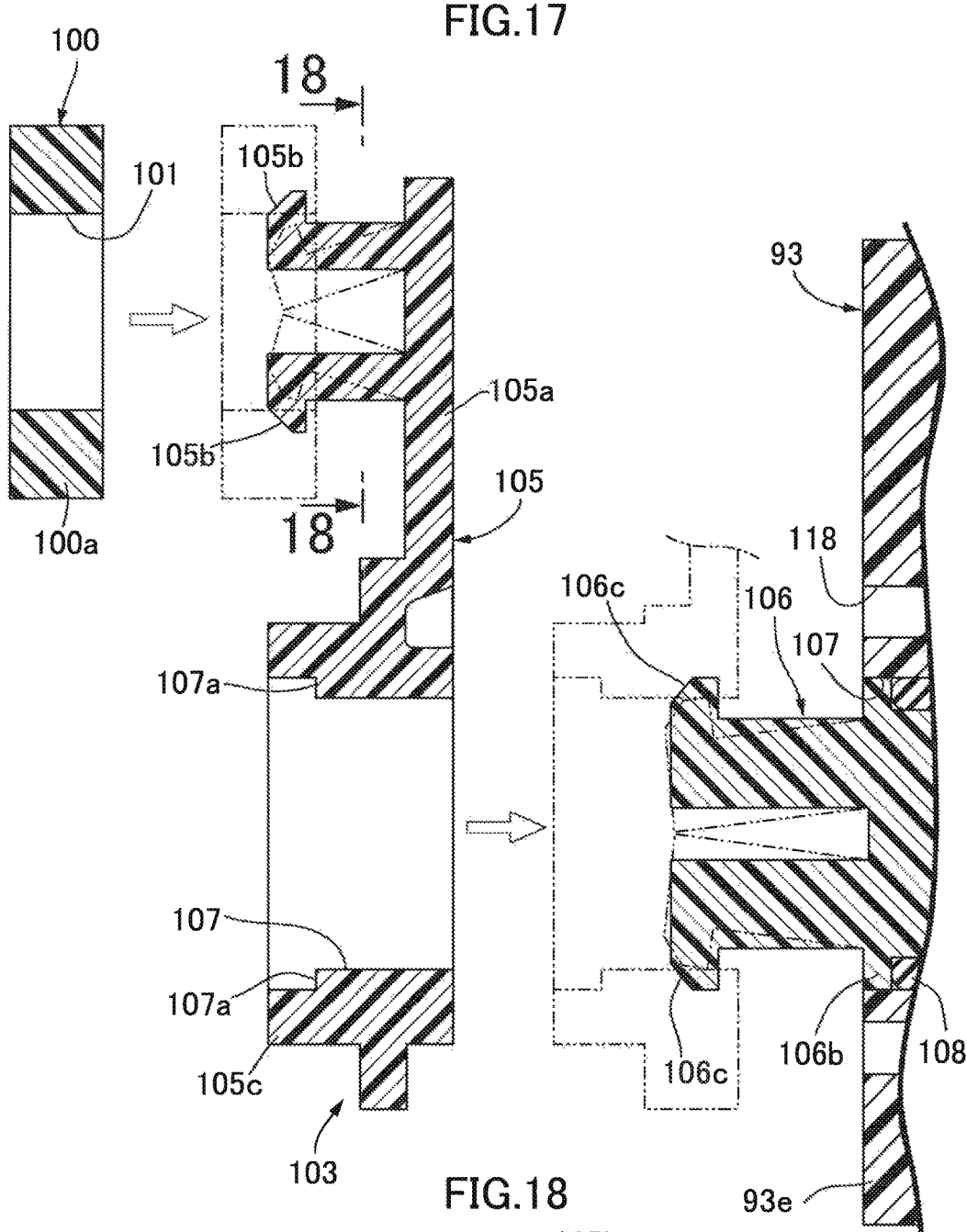
FIG. 17 is an exploded sectional view of part of an operating force-acting direction conversion mechanism (second embodiment)
Figure 18:
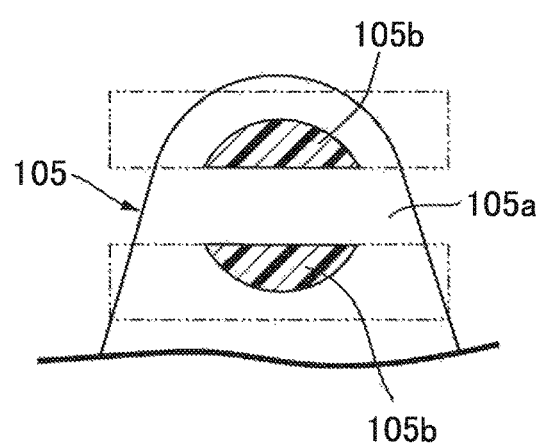
FIG. 18 is a sectional view along line 18-18 in FIG. 17. (second embodiment)

Referring in addition to FIG. 17 and FIG. 18, the first link member 105 is formed so as to integrally have a first link member main portion 105a disposed along the outer face of the end wall 93e in the case main body 93 of the case 92, a pair of first resiliently engaging claws 105b integrally and projectingly provided, on the side opposite to the end wall 93e, on one end part of the first link member main portion 105a so as to pivotably and resiliently engage with the linking portion 100a when inserted into the first linking hole 101 of the emergency operation member 100, and a linking tube portion 105c provided integrally with the other end part of the first link member main portion 105a.

A second linking hole 107 having a rectangular cross section is formed in the linking tube portion 105c, and a latching step portion 107a is formed on each of mutually opposing side faces of an end part, on the side opposite to the end wall 93e, of the second linking hole 107.

A cutout part 112 is formed in part of the outer periphery of the first link member main portion 105a around the linking tube portion 105c, the cutout part 112 having a pivoting restriction face 113 at one end in the peripheral direction. On the other hand, a stopper 116 disposed within the cutout part 112 is projectingly provided on the end wall 93e of the case main body 93, and a stopper face 114 that can abut against the pivoting restriction face 113 is formed on the stopper 116.

The second link member 106 is formed so as to integrally have a second link member main portion 106a disposed along the inner face of the end wall 93e in the case main body 93 of the case 92 while enabling its extremity part to abut against the pressure-receiving projection 104 from the restriction position side, a shaft portion 106b integrally and connectedly provided on a base end part of the second link member main portion 106a so as to be pivotably fitted into a support hole 108 formed in the end wall 93e, and a pair of second resiliently engaging claws 106c integrally and connectedly provided on the other end part of the shaft portion 106b on the outside of the end wall 93e. An annular seal member 109 that is in resilient contact with an inner face of the support hole 108 is fitted around the outer periphery of the shaft portion 106b.

The second resiliently engaging claw 106c is inserted into the second linking hole 107 of first link member 105 while being flexed, and resiliently engages with the latching step portion 107a. This links the second link member 106 non-pivotably to the first link member 105.

A return spring 117 is disposed between the case main body 93 and the first link member 105. The return spring 117 is a torsion spring having a coil portion 117a; the coil portion 117a is housed in an annular housing groove 118 formed in the end wall 93e so as to be coaxial with the shaft portion 106b of the second link member 106 and open on the first link member 105 side, one end portion 117b of the return spring 117 is engaged with a latching groove 119 formed in the stopper 116, and the other end portion 117c of the return spring 117 is inserted into and engaged with a latching hole 120 formed in the first link member main portion 105a of the first link member 105.

Figure 19:
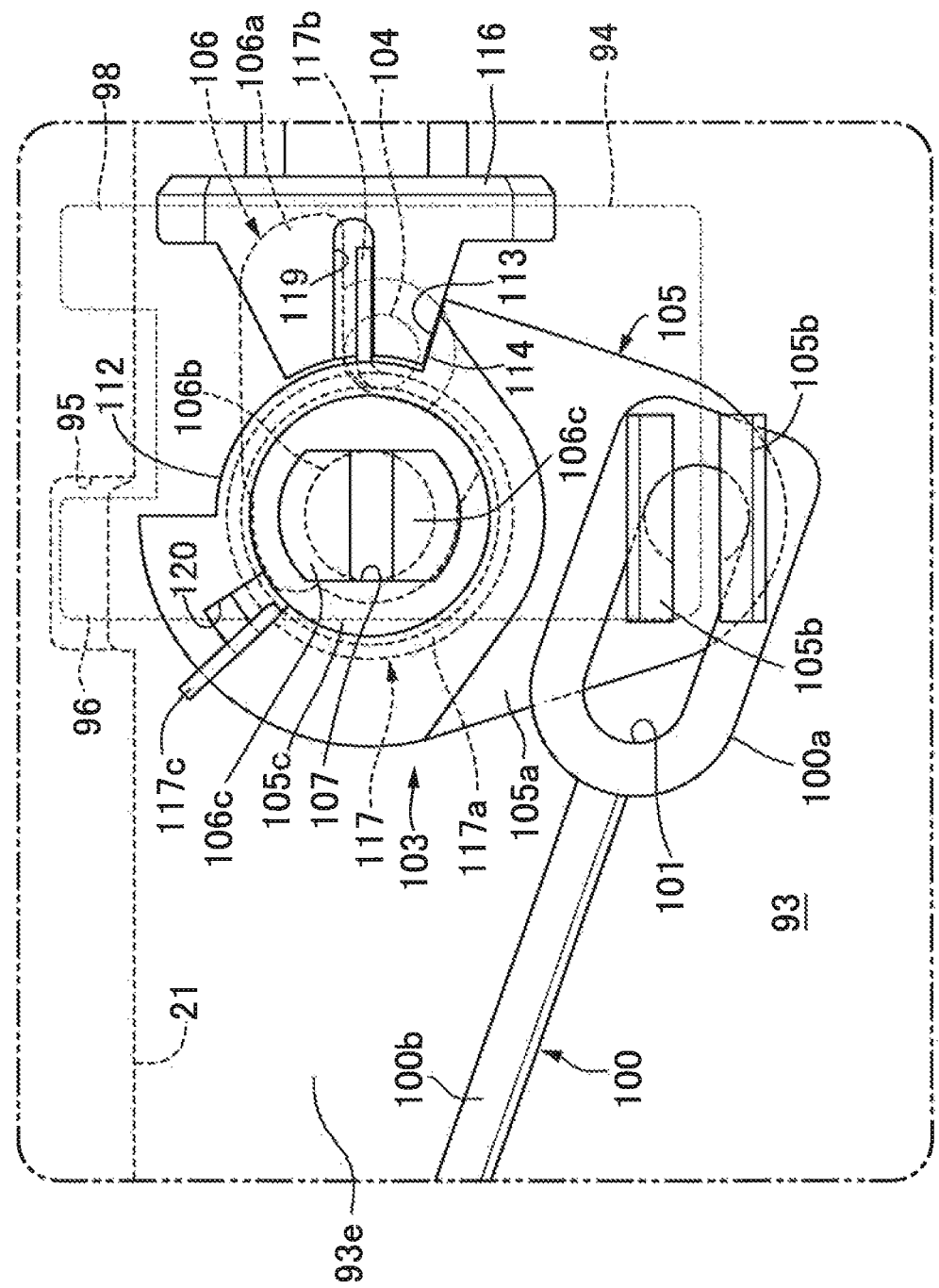
FIG. 19 is an enlarged view of a part shown by arrow 19 in FIG. 15 when the emergency operation member is in the non-operated state. (second embodiment)

In accordance with the operating force-acting direction conversion mechanism 103 having the above arrangement, when the restriction member 94 is in the restriction position and the emergency operation member 100 is in a non-operated state, as shown in FIG. 15 and FIG. 19 the first link member 105 is put into a state in which the pivoting restriction face 113 is made to abut against the stopper face 114 of the stopper 116 by means of the spring force exhibited by the return spring 117 and is restricted from pivoting, and an extremity part of the second link member main portion 106a of the second link member 106 remains stationary in a state in which it is close to the pressure-receiving projection 104 of the restriction member 94 from the restriction position side.

When the restriction member 94 is moved from the restriction position toward the restriction release position side by operation of the electric motor 29, the first link member 105 is, by virtue of the spring force of the return spring 117, put a state in which pivoting thereof is restricted while the pivoting restriction face 113 remains abutted against the stopper face 114 of the stopper 116, and the second link member 106 is also held stationary without pivoting by following the pressure-receiving projection 104.

Figure 20:
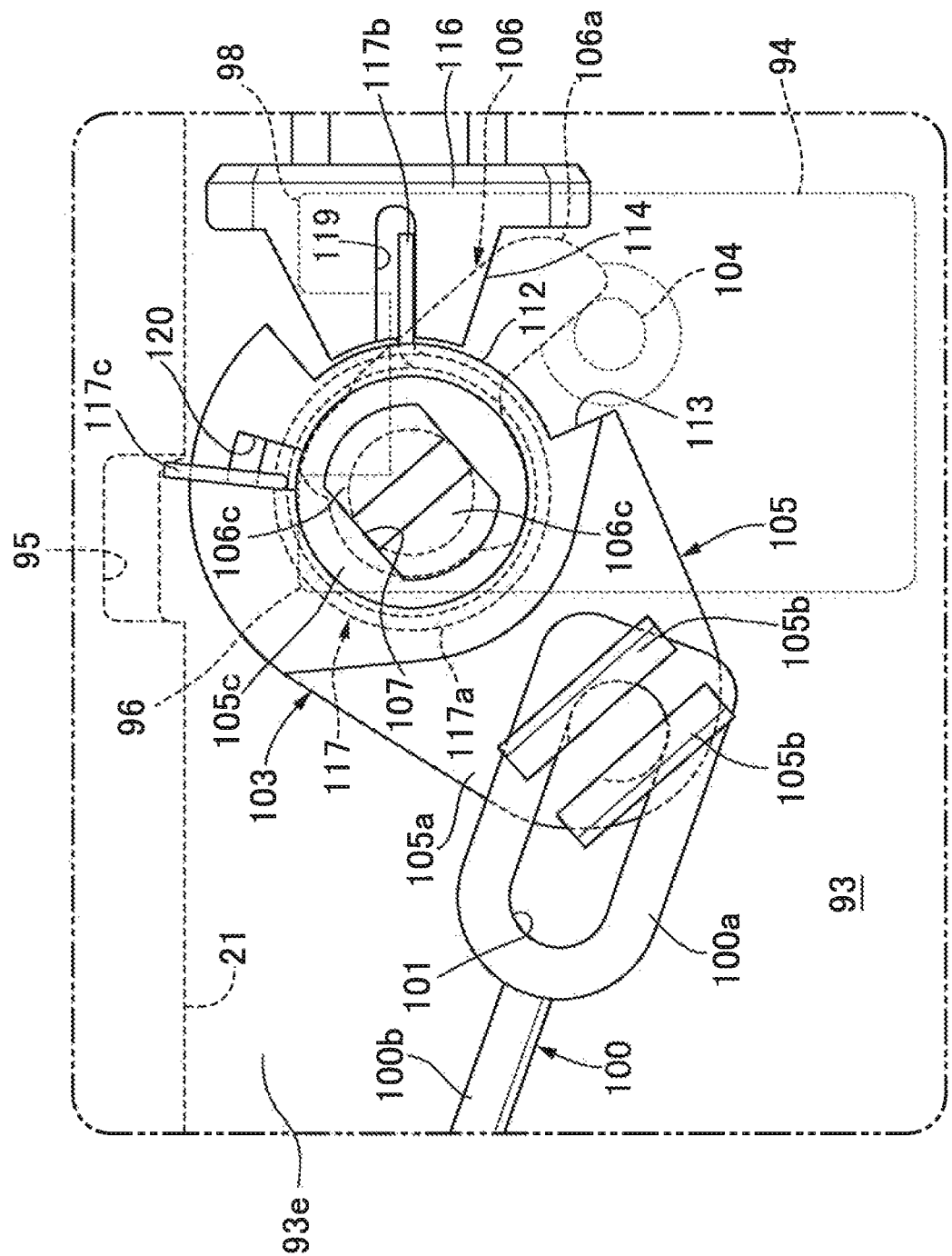
FIG. 20 is a view, corresponding to FIG. 19, when the emergency operation member is operated. (second embodiment)

When the emergency operation member 100 is pulled against the spring force of the return spring 117 in a state in which the restriction member 94 is at the restriction position, as shown in FIG. 20 the first and second link members 105 and 106 pivot, the pressure-receiving projection 104 is pressed by the extremity part of the second link member main portion 106a, and the restriction member 94 moves to the restriction release position. In this arrangement, an end part, on the side opposite to the pivoting restriction face 113 in the peripheral direction, of the cutout part 112 of the first link member 105 will not abut against the stopper 116, and pivoting of the first link member 105 will not be restricted by the stopper 116.

In accordance with the second embodiment, since the operating force-acting direction conversion mechanism 103 is formed from the pressure-receiving projection 104 integrally and projectingly provided on the restriction member 94, the first link member 105 pivoting in response to operation of the emergency operation member 100, and the second link member 106 having its extremity part abutting against the pressure-receiving projection 104 from the restriction position side and pivoting so as to press the restriction member 94 toward the restriction release position in response to pivoting of the first link member 105, the operating force-acting direction conversion mechanism 103 can be formed simply with a link mechanism having a minimum number of components.

Embodiments of the present invention are explained above, but the present invention is not limited to the above embodiments and may be modified in a variety of ways as long as the modifications do not depart from the subject matter.

The invention claimed is:

1. A lid opening and closing device for a vehicle, comprising:
 a rod that can move forward and backward in a first axial direction along an axis thereof between a pushed-in position, in response to an openable and closable lid being pushed in, and a protruding position when the lid is in an open state, the rod operable to attain a lid closed position at which the rod returns from the pushed-in position toward the protruding position side only by a predetermined amount of movement when the lid is in a closed state, the rod being operable to rotate when the rod is moved between the pushed-in position and the protruding position,
 a restriction member that is capable of reciprocally moving in a direction orthogonal to the first axial direction, between a restriction position, at which movement of the rod at the lid closed position is restricted, and a restriction release position at which the restriction is released,
 an electric motor that drives the restriction member between the restriction position and the restriction release position in response to a door switching between a locked state and an unlocked state,
 a case that houses the restriction member and the electric motor,
 and an emergency operation member that can move the restriction member to the restriction release position when the electric motor malfunctions,
 wherein an operating force-acting direction conversion mechanism is provided between the emergency operation member and the restriction member, the operating force-acting direction conversion mechanism operable to convert an operating force, from the emergency operation member moving in a direction parallel to the first axial direction, into a force that causes movement of the restriction member from the restriction position toward the restriction release position, and wherein a guide projecting part having a guide hole therein is formed integrally on an outer surface of the case, the emergency operation member being movably fitted into the guide hole, and the movement thereof guided by the guide hole.

2. The lid opening and closing device for vehicle according to claim 1, wherein the operating force-acting direction conversion mechanism is formed from a projection that is integrally and projectingly provided on the restriction member, and a cam part that is formed on the emergency operation member in an inclined manner so as to obliquely intersect a direction of operation of the restriction member and that abuts against the projection.

3. The lid opening and closing device for a vehicle according to claim 2, wherein a guide slot is provided in the emergency operation member so as to extend lengthwise in a direction of movement thereof, and a guide projection is projectingly provided on the case, the guide projection guiding slidable movement of the emergency operation member and projecting into the guide slot so as to restrict an end of movement of the emergency operation member.

4. The lid opening and closing device for a vehicle according to claim 1, wherein a guide slot is provided in the emergency operation member so as to extend lengthwise in a direction of movement thereof, and a guide projection is projectingly provided on the case, the guide projection guiding slidable movement of the emergency operation member and projecting into the guide slot so as to restrict an end of movement of the emergency operation member.

5. The lid opening and closing device for a vehicle according to claim 1, wherein the operating force-acting direction conversion mechanism is formed from
a pressure receiving projection that is integrally and projectingly provided on the restriction member,
a first link member that pivots in response to operation of the emergency operation member,
and a second link member that has an extremity part thereof abutting against the pressure-receiving projection from the restriction position side and pivots so as to press the restriction member toward the restriction release position in response to pivoting of the first link member.

6. The lid opening and closing device for a vehicle according to claim 1, wherein the rod is operable to rotate about its axis by 90 degrees when the rod is moved between the pushed-in position and the protruding position.

7. A lid opening and closing device for a vehicle, comprising:
a rod that can move forward and backward in a first axial direction along an axis thereof between a pushed-in position, in response to an openable and closable lid being pushed in, and a protruding position when the lid is in an open state, the rod operable to attains a lid closed position at which the rod returns from the pushed-in position toward the protruding position side only by a predetermined amount of movement when the lid is in a closed state, the rod having a helical guide groove formed in an outer periphery thereof, wherein the rod is operable to rotate about its axis by 90 degrees when the rod is moved between the pushed-in position and the protruding position,
a restriction member that is capable of reciprocally moving in a direction orthogonal to the first axial direction, between a restriction position, at which movement of the rod at the lid closed position is restricted, and a restriction release position at which the restriction is released,
an electric motor that drives the restriction member between the restriction position and the restriction release position in response to a door switching between a locked state and an unlocked state,
a case that houses the restriction member and the electric motor, the case having a case projection which is integrally and projectingly provided on an inner wall thereof, the projection extending into the guide groove of the rod,
and an emergency operation member that can move the restriction member to the restriction release position when the electric motor malfunctions,
wherein an operating force-acting direction conversion mechanism is provided between the emergency operation member and the restriction member, the operating force-acting direction conversion mechanism operable to convert an operating force, from the emergency operation member moving in a direction parallel to the first axial direction, into a force that causes operation from the restriction position toward the restriction release position.

8. The lid opening and closing device for a vehicle according to claim 7, wherein an inner end portion of the rod has a cylindrical spring housing recess formed therein, a first end portion of a coil spring is housed in the spring housing recess, and a second end portion of the spring contacts a wall portion of the case, and when the restriction member is moved to the restriction release position, the spring causes the rod to move outwardly in relation to the case, whereby the engagement of the case projection in the helical guide groove causes the rod to rotate about its axis by 90 degrees during such outward movement thereof.

9. The lid opening and closing device for vehicle according to claim 7, wherein the operating force-acting direction conversion mechanism is formed from a projection that is integrally and projectingly provided on the restriction member, and a cam part that is formed on the emergency operation member in an inclined manner so as to obliquely intersect a direction of operation of the restriction member and that abuts against the projection.

10. The lid opening and closing device for a vehicle according to claim 9, wherein a guide slot is provided in the emergency operation member so as to extend lengthwise in a direction of movement thereof, and a guide projection is projectingly provided on the case, the guide projection guiding slidable movement of the emergency operation member and projecting into the guide slot so as to restrict an end of movement of the emergency operation member.

11. The lid opening and closing device for a vehicle according to claim 7, wherein a guide slot is provided in the emergency operation member so as to extend lengthwise in a direction of movement thereof, and a guide projection is projectingly provided on the case, the guide projection guiding slidable movement of the emergency operation member and projecting into the guide slot so as to restrict an end of movement of the emergency operation member.

12. The lid opening and closing device for a vehicle according to claim 7, wherein the operating force-acting direction conversion mechanism is formed from
a pressure receiving projection that is integrally and projectingly provided on the restriction member,
a first link member that pivots in response to operation of the emergency operation member,
and a second link member that has an extremity part thereof abutting against the pressure-receiving projection from the restriction position side and pivots so as to press the restriction member toward the restriction release position in response to pivoting of the first link member.

13. The lid opening and closing device for a vehicle according to claim 7, wherein an outer end portion of the rod is formed as a substantially T-shaped engagement portion, and wherein when the rod spins on its axis by 90 degrees, the engagement portion is switched between an engagement orientation and a release orientation thereof.

14. A lid opening and closing device for a vehicle, comprising:
  a rod that can move forward and backward in a first axial direction along an axis thereof between a pushed-in position, in response to an openable and closable lid being pushed in, and a protruding position when the lid is in an open state, the rod operable to attain a lid closed position at which the rod returns from the pushed-in position toward the protruding position side only by a predetermined amount of movement when the lid is in a closed state,
  a restriction member that is capable of reciprocally moving in a direction orthogonal to the first axial direction, between a restriction position, at which movement of the rod at the lid closed position is restricted, and a restriction release position at which the restriction is released,
  an electric motor that drives the restriction member between the restriction position and the restriction release position in response to a door switching between a locked state and an unlocked state,
  a case that houses the restriction member and the electric motor,
  and an emergency operation member that can move the restriction member to the restriction release position when the electric motor malfunctions,
  wherein:
  an operating force-acting direction conversion mechanism is provided between the emergency operation member and the restriction member, the operating force-acting direction conversion mechanism operable to convert an operating force, from the emergency operation member moving in a direction parallel to the first axial direction, into a force that causes movement of the restriction member from the restriction position toward the restriction release position,
  a guide projecting part having a guide hole therein is formed integrally on an outer surface of the case, the emergency operation member being movably fitted into the guide hole, and the movement thereof guided by the guide hole, and
  an outer end portion of the rod is formed as a substantially T-shaped engagement portion.

* * * * *